(12) United States Patent
Inoguchi et al.

(10) Patent No.: US 6,480,337 B2
(45) Date of Patent: *Nov. 12, 2002

(54) IMAGE DISPLAY APPARATUS

(75) Inventors: Kazutaka Inoguchi, Kawasaki (JP); Shoichi Yamazaki, Yokohama (JP); Akinari Takagi, Yokosuka (JP); Hideki Morishima, Kawasaki (JP)

(73) Assignee: Mixed Reality Systems Laboratory Inc., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 16 days.

(21) Appl. No.: 09/514,306

(22) Filed: Feb. 28, 2000

(65) Prior Publication Data

US 2002/0034016 A1 Mar. 21, 2002

(30) Foreign Application Priority Data

Mar. 4, 1999 (JP) ............................................ 11-056736
Mar. 4, 1999 (JP) ............................................ 11-056737
Mar. 4, 1999 (JP) ............................................ 11-056738

(51) Int. Cl.$^7$ ................................................ G02B 27/14
(52) U.S. Cl. ........................ 359/630; 359/631; 359/633; 359/637
(58) Field of Search ................................ 359/629, 630, 359/631, 633, 637

(56) References Cited

U.S. PATENT DOCUMENTS

| 5,646,783 | A | * | 7/1997 | Banbury | 359/630 |
| 5,886,822 | A | * | 3/1999 | Spitzer | 359/630 |
| 6,157,291 | A | * | 12/2000 | Kuenster et al. | 340/8 |
| 6,222,677 | B1 | * | 4/2001 | Budd et al. | 359/630 |
| 6,239,915 | B1 | * | 5/2001 | Takagi et al. | 359/629 |

FOREIGN PATENT DOCUMENTS

JP          11-125791        11/1999

* cited by examiner

Primary Examiner—Georgia Epps
Assistant Examiner—Tim Thompson
(74) Attorney, Agent, or Firm—Fitzpatrick, Cella, Harper & Scinto

(57) ABSTRACT

An image display apparatus has a light source, a reflective display device, an illumination optical system for guiding light from the light source to the display device to illuminate the display device, and a display optical system for guiding the light reflected by the display device to the pupil of an observer to allow the observer to observe an image displayed on the display panel. The illumination optical system and the display optical system have an optical element shared in part or are arranged so as not to interfere with each other, thereby providing the image display apparatus of compact structure. Particularly, where the display optical system is a thin optical system having a plurality of decentered, reflecting, curved surfaces, the appropriate illumination optical system is arranged, thereby providing the thin image display apparatus using the reflective display device.

67 Claims, 16 Drawing Sheets

IMAGE DISPLAY APPARATUS

BACKGROUND OF THE INVENTION

1. Field of the Invention

The present invention relates to an image display apparatus, which is suitably applicable, for example, to head-mounted displays, goggle type displays, etc. designed so as to observe an enlarged image of image information displayed on a reflective liquid-crystal display element as a display element through an optical element having a free curved surface properly set.

2. Related Background Art

A variety of proposals have been made heretofore for the head-mounted image observing apparatus (image display apparatus), which are so called head-mounted displays, in such structure as to permit an observer to observe an enlarged virtual image of the image information displayed on the image display device of liquid crystal or the like, for example, by use of an optical element having an entrance surface, a plurality of reflective surfaces, and an exit surface in surfaces of a transparent material.

For example, Japanese Patent Application Laid-Open Nos. 7-333551, 8-50256, 8-160340, 8-179238 and 8-234137, etc. suggest the image observation apparatus the overall scale of which is decreased by using an LCD (liquid crystal display) as a display means for displaying the image information and using a compact prism as an observation optical system.

FIG. 1 is a schematic diagram of the major part of the image observation apparatus suggested in Japanese Patent Application Laid-Open No. 7-333551. In FIG. 1, light emitted from the LCD 51 is made incident to the entrance surface 53 of compact prism 52. Then the light is folded between a totally reflecting surface 54 with curvature, formed in the compact prism 52, and a reflecting surface 55 and thereafter the light is made to emerge from the compact prism 52 to be guided to the observer E. This results in forming a virtual image of the image information displayed on the display means (LCD) 51 and thus permits the observer E to observe the virtual image. The reflecting surface 55 of the compact prism 52 is comprised of an eccentric, free, curved surface, which is a decentered, rotationally asymmetric surface (a surface with different optical powers depending upon azimuths; a so-called free curved surface).

FIG. 2 is a schematic diagram of the major part of the image observation apparatus using a conventional, coaxial, concave mirror. In the same figure the light from the image information displayed on the display device 61 is reflected by a half mirror 62 and then is made incident to the concave mirror 63. The light reflected by the concave mirror 63 is guided through the half mirror 62 to the observer E. The image information displayed on the display device 61 is formed as an enlarged virtual image by the concave mirror 63. This permits the observer to observe the enlarged virtual image of the image information displayed on the display device 61.

The optical system of the type illustrated in FIG. 1 has such a feature that it is easier to decrease the overall scale of the apparatus and to increase the field of view than in the type using the conventional, coaxial, concave mirror illustrated in FIG. 2.

There are particular desires for the decrease in the scale and weight of the whole apparatus, because the image observation devices such as the head-mounted displays, the goggle type displays, and the like are mounted on the head. Another important issue is to widen the field of view in order to provide the observation of image information displayed on the display means with strong appeal.

In the case of the image observation apparatus such as the head-mounted displays (HMD), the goggle type displays, and the like of the type as illustrated in FIG. 1, where the display device is constructed of a reflective display device (for example, a reflective, ferroelectric, liquid crystal display device), which has a high aperture ratio and which is advantageous in the decrease of scale, it is necessary to interpose an illumination system 70 for illuminating the display device 51 between the display device 51 and the entrance surface 53 of the compact prism 52, as illustrated in FIG. 3.

Here the illumination system 70, for example, has a light source 71, a condenser lens 72 for condensing the light from the light source 71 and converting it into parallel light, a prism 73 including a half mirror surface 73a for reflecting the light from the condenser lens 72 to illuminate the display device 51, and so on. In the image observation apparatus the use of the reflective display element requires the placement of the illumination system for illuminating it between the display device 51 and the compact prism 52 and thus requires increase in the space between the prism 52 and the display device 51, as illustrated in FIG. 3. Therefore, there arise problems that the feature of this type is not taken advantage of and that it is difficult to decrease the size and weight and to increase the field of view.

SUMMARY OF THE INVENTION

An object of the present invention is to provide an image display apparatus that permits the observer to observe the image information in a wide field of view and with good image quality while achieving the compactification of the whole apparatus, by properly setting an optical system from light source means to display means (an illumination optical system) and an optical system for guiding the light from the display means to the observer's eye (a display optical system), in observing the image information displayed on the display means such as a liquid crystal display or the like.

Another object of the present invention is to provide an image display apparatus suitably applicable as a head-mounted display that permits the observer to observe the image information displayed on the liquid crystal display in good order while achieving the compactification of the whole apparatus, by such structure that when the image information displayed on the liquid crystal display is observed using, for example, the reflective liquid crystal display as image display means and using, for example, an optical element having integrally formed surfaces of an entrance surface to which light from the liquid crystal display element is made incident, a decentered, curved, reflecting surface for reflecting the light entering the entrance surface, and an exit surface from which the light from the curved, reflecting surface is made to emerge, as display optical system, an illumination device for illuminating the liquid crystal display is properly set in accordance with the feature of the enlarging display system.

An image display apparatus according to one aspect of the present invention is an image display apparatus comprising: reflective display means; an illumination optical system for making light from light source means obliquely incident to a display surface of the display means; and a display optical system for guiding light from the display means to an observer to permit the observer to observe image information displayed on the display means, wherein a principal ray emerging from a central part of the display means is emergent obliquely from the display means, the display optical system comprises a decentered, rotationally asymmetric, reflecting surface, the illumination optical system and the display optical system share at least one optical element, and at least one surface of the optical element(s) shared is a curved surface.

An image display apparatus according to one aspect of the present invention is an image display apparatus comprising: a reflective display device; an illumination optical system for guiding light from light source means to the display device; and a display optical system for guiding the light reflected by the display device to the eye of an observer to allow the observer to observe an image, wherein at least one surface of the display optical system is a decentered, rotationally asymmetric, reflecting surface, a principal ray of display light at a center of a field of view from the display device is emergent at a predetermined angle relative to a normal to a display surface of the display device, the illumination optical system and the display optical system share an optical element, and at least one surface of the optical element is a curved surface.

In one aspect of the present invention, the surface of the optical element is a rotationally asymmetric surface.

In one aspect of the present invention, the optical element comprises a surface acting as a transmitting surface in an optical path of the display optical system and acting as a reflecting surface in an optical path of the illumination optical system.

In one aspect of the present invention, the surface of the optical element acts as a surface having a positive power in both of the display optical system and the illumination optical system.

In one aspect of the present invention, the surface of the optical element is a curved surface.

In one aspect of the present invention, the reflective display device is a ferroelectric liquid crystal display.

An image observation apparatus according to one aspect of the present invention is an image display apparatus wherein light from light source means is guided via a first prism of a single medium having three or more optical surfaces comprising a decentered surface, to illuminate reflective display means obliquely, and light emerging obliquely from the display means is guided via part of the optical surfaces of the first prism and via a second prism of a single medium having three or more optical surfaces comprising a decentered surface to an observer, whereby the observer is allowed to observe image information displayed on the display means.

In one aspect of the present invention, the first prism comprises an entrance surface to which the light from the light source means is incident, a half mirror surface comprised of a rotationally asymmetric surface for reflecting part of light from the entrance surface, and an exit surface from which light reflected by the half mirror surface emerges toward the display means.

In one aspect of the present invention, the light from the display means is incident through the exit surface of the first prism, the light then travels through the half mirror surface and emerges from the first prism, and thereafter the light is incident to the second prism.

In one aspect of the present invention, the second prism comprises an entrance surface to which the light from the half mirror surface of the first prism is incident, a totally reflecting surface for totally reflecting the light from the entrance surface, a reflecting surface comprised of a rotationally asymmetric surface for reflecting the light from the totally reflecting surface, and an exit surface having the same shape as the totally reflecting surface, from which the light from the reflecting surface emerges.

An image display apparatus according to one aspect of the present invention is an image display apparatus comprising: reflective display means; an illumination optical system for making light from light source means incident to a display surface of the display means; and a display optical system for guiding light from the display means to the pupil of an observer to allow the observer to observe image information displayed on the display means, wherein the illumination optical system guides the light from the light source means via a prism of a triangular prism shape making use of a totally reflecting surface to the display means, the display optical system guides the light from the display means through the totally reflecting surface of the prism to the observer, and an angle between the totally reflecting surface and the display surface of the display means is set so as to satisfy the following condition:

$$(D_y/L_y) \cdot W_y° < \theta < 40°$$

where $D_y$ represents the diameter of the exit pupil formed by the display optical system in the y-direction, $L_y$ represents an effective image display size in the y-direction, and $W_y$ represents a field of view in the y-direction.

In the image display apparatus according to one aspect of the present invention, a prism vertex angle $P\theta$ of the prism is set to satisfy $(D_y/L_y) \cdot W_y° < P\theta < 40°$.

An image display apparatus according to one aspect of the present invention is an image display apparatus comprising: light source means; reflective display means; an illumination optical system for guiding light from the light source means to the display means; a display optical system for guiding the light reflected by the display means to the pupil of an observer and making the observer recognize a virtual image formed thereby as an enlarged image of an image displayed on the display means; and an optical member comprising an optical surface acting to totally reflect light when guiding the light from the light source means to the display means and acting to transmit light when guiding the light reflected by the display means to the pupil, wherein an angle $\theta$ between the optical surface and an image display surface of the display means is set to satisfy $\theta < 45°$.

In the image display apparatus according to one aspect of the present invention, the display optical system comprises an optical element making use of a plurality of reflecting surfaces and each of the reflecting surfaces forming the optical element is comprised of a surface decentered from a principal ray at a center of a field of view.

In the image display apparatus according to one aspect of the present invention, at least one optical surface forming the optical element is a rotationally asymmetric surface.

In the image display apparatus according to one aspect of the present invention, one of the rotationally asymmetric surfaces comprises an optical surface acting as a totally reflecting surface and also as a transmitting surface.

In the image display apparatus according to one aspect of the present invention, the optical member is comprised of a prism in which an entrance surface, a reflecting surface, and an exit surface are formed integrally, and the light from the light source means is guided into the entrance surface, is reflected by the reflecting surface, and is guided out of the exit surface toward the display means.

In the image display apparatus according to one aspect of the present invention, at least a partial area makes use of total reflection, out of reflection on the reflecting surface of the optical member.

In the image display apparatus according to one aspect of the present invention, the optical member comprises at least one curved surface.

In the image display apparatus according to one aspect of the present invention, the illumination optical system comprises at least one rotationally asymmetric surface.

In the image display apparatus according to one aspect of the present invention, the display means is a ferroelectric liquid crystal panel.

In the image display apparatus according to one aspect of the present invention, the light source means comprises a light source for emitting light of three colors of R, G, and B and the light source means emits the light in synchronism with image display on the display means.

In the image display apparatus according to one aspect of the present invention, the light source comprises LEDs for emitting the light of the three colors of R, G, and B.

An image display apparatus according to one aspect of the present invention is an image display apparatus comprising: reflective display means; an illumination optical system for making light from light source means incident to a display surface of the display means; and a display optical system for guiding light from the display means to the pupil of an observer to allow the observer to observe image information displayed on the display means, wherein the illumination optical system guides the light from the light source means via an optical member making use of a totally reflecting surface to the display means and the display optical system guides the light from the display means through the totally reflecting surface of the optical member to the observer.

In the image display apparatus according to one aspect of the present invention, the display optical system comprises an optical element making use of a plurality of reflecting surfaces and each of the surfaces forming the optical element is comprised of a surface decentered from a principal ray at a center of a field of view.

In the image display apparatus according to one aspect of the present invention, at least one optical surface forming the optical element is comprised of a rotationally asymmetric surface.

In the image display apparatus according to one aspect of the present invention, one of the rotationally asymmetric surfaces comprises an optical surface acting as a totally reflecting surface and also as a transmitting surface.

In the image display apparatus according to one aspect of the present invention, the optical member is comprised of a prism in which an entrance surface, a reflecting surface, and an exit surface are formed integrally, and the light from the light source means is guided into the entrance surface, is reflected by the reflecting surface, and is guided out of the exit surface toward the display means.

In the image display apparatus according to one aspect of the present invention, at least a partial area makes use of total reflection, out of reflection on the reflecting surface of the optical member.

In the image display apparatus according to one aspect of the present invention, the optical member comprises at least one curved surface.

In the image display apparatus according to one aspect of the present invention, the illumination optical system comprises at least one rotationally asymmetric, curved surface.

In the image display apparatus according to one aspect of the present invention, the display means is a ferroelectric liquid crystal display.

In the image display apparatus according to one aspect of the present invention, the light source means comprises a light source for emitting light of three colors of R, G, and B and the light source means emits the light in synchronism with image display on the display means.

In the image display apparatus according to one aspect of the present invention, the light source comprises LED elements for emitting the light of the three colors of R, G, and B.

An image display apparatus according to one aspect of the present invention is an image display apparatus comprising: a reflective display element; an illumination optical system for making light from light source means incident to a display surface of the display means; and a display optical system for guiding light from the display means to the pupil of an observer to allow the observer to observe image information displayed on the display means, wherein the display optical system is arranged so as not to interfere with an illumination optical path running from the light source means to the display means and the illumination optical system is arranged so as not to interfere with a display optical path running from the display means to the display optical system.

In the image display apparatus according to one aspect of the present invention, the display optical system comprises a plurality of reflecting surfaces and each of the plurality of reflecting surfaces is comprised of a surface decentered from a principal ray at a center of a field of view.

In the image display apparatus according to one aspect of the present invention, the display optical system comprises an optical surface acting as a totally reflecting surface and also as a transmitting surface.

In the image display apparatus according to one aspect of the present invention, a reflection film is formed in part of the surface functioning as a totally reflecting surface and also as a transmitting surface.

In the image display apparatus according to one aspect of the present invention, at least one optical surface forming the display optical system is comprised of a rotationally asymmetric surface.

In the image display apparatus according to one aspect of the present invention, the reflective display means is a ferroelectric liquid crystal display.

In the image display apparatus according to one aspect of the present invention, polarizing plates whose axes of polarization are approximately perpendicular to each other are placed between the light source means and the display means and between the display means and the display optical system.

In the image display apparatus according to one aspect of the present invention, a ray traveling from the light source means to the display means intersects with a ray traveling from the display means to the display optical system only on the display means.

An image display apparatus according to one aspect of the present invention is an image display apparatus comprising: reflective display means; an illumination optical system for making light from light source means incident to the display means; and a display optical system for guiding light from the display means to an observation position of an observer, the display optical system comprising a plurality of decentered, reflecting surfaces each having an optical power, wherein a principal ray at a center of a field of view, passing a center of an exit pupil of the display optical system, is emergent at a predetermined angle relative to a normal to an image display surface of the display means.

In the image display apparatus according to one aspect of the present invention, the display optical system comprises an optical element in which an entrance surface, a plurality of decentered, curved, reflecting surfaces, and an exit surface are made in surfaces of a material.

In the image display apparatus according to one aspect of the present invention, the decentered, reflecting surfaces each with the optical power forming the display optical system are rotationally asymmetric surfaces.

In the image display apparatus according to one aspect of the present invention, the illumination optical system comprises an optical element having a positive power and being independent of the display optical system.

In the image display apparatus according to one aspect of the present invention, the illumination means turns on light of the three primary colors of R, G, and B in time series in synchronism with image display on the display means, thereby implementing color display.

In the image display apparatus according to one aspect of the present invention, the display means is a ferroelectric liquid crystal panel.

In the image display apparatus according to one aspect of the present invention, the illumination optical system comprises a first polarizing plate for forming illumination light linearly polarized in a predetermined direction and the display optical system comprises a second polarizing plate whose axis of polarization is approximately perpendicular to that of the first polarizing plate.

DETAILED DESCRIPTION OF THE PREFERRED EMBODIMENTS

Figure 1:
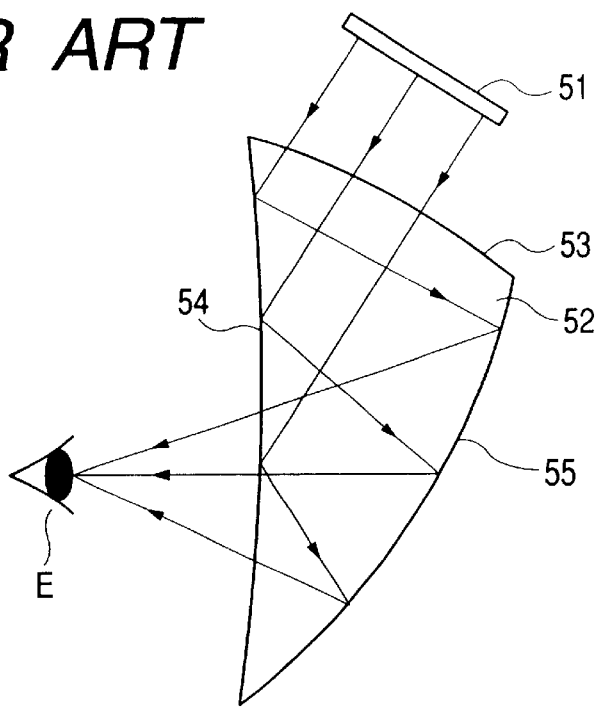
FIG. 1 is a schematic diagram of the major part of the conventional image display apparatus.
Figure 2:
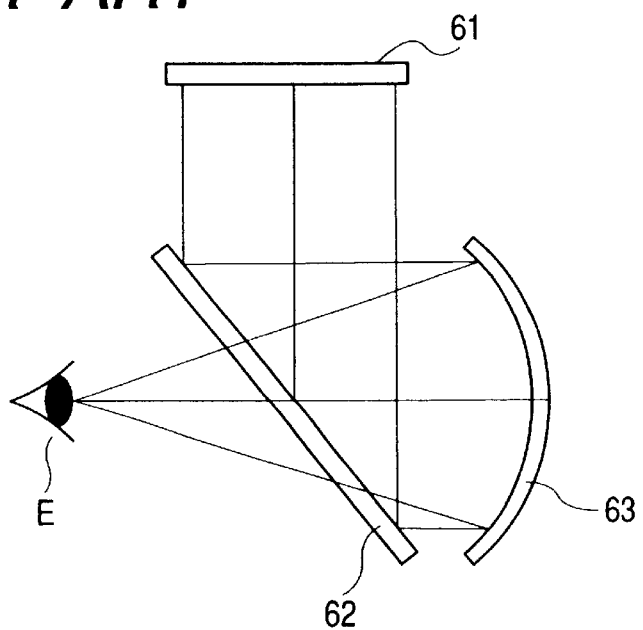
FIG. 2 is a schematic diagram of the major part of the conventional image display apparatus.
Figure 3:
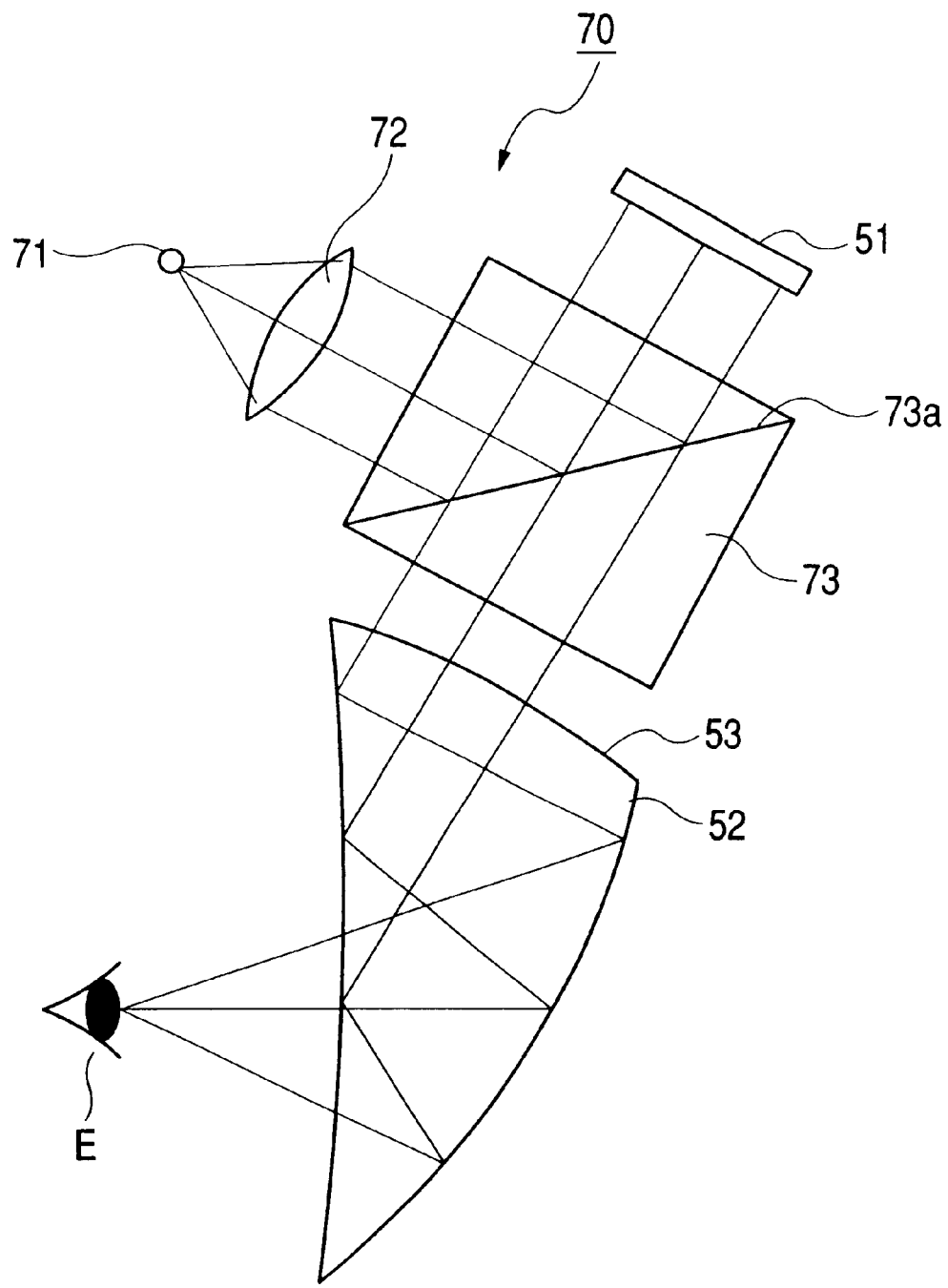
FIG. 3 is a schematic diagram of the major part of the conventional image display apparatus.
Figure 4:
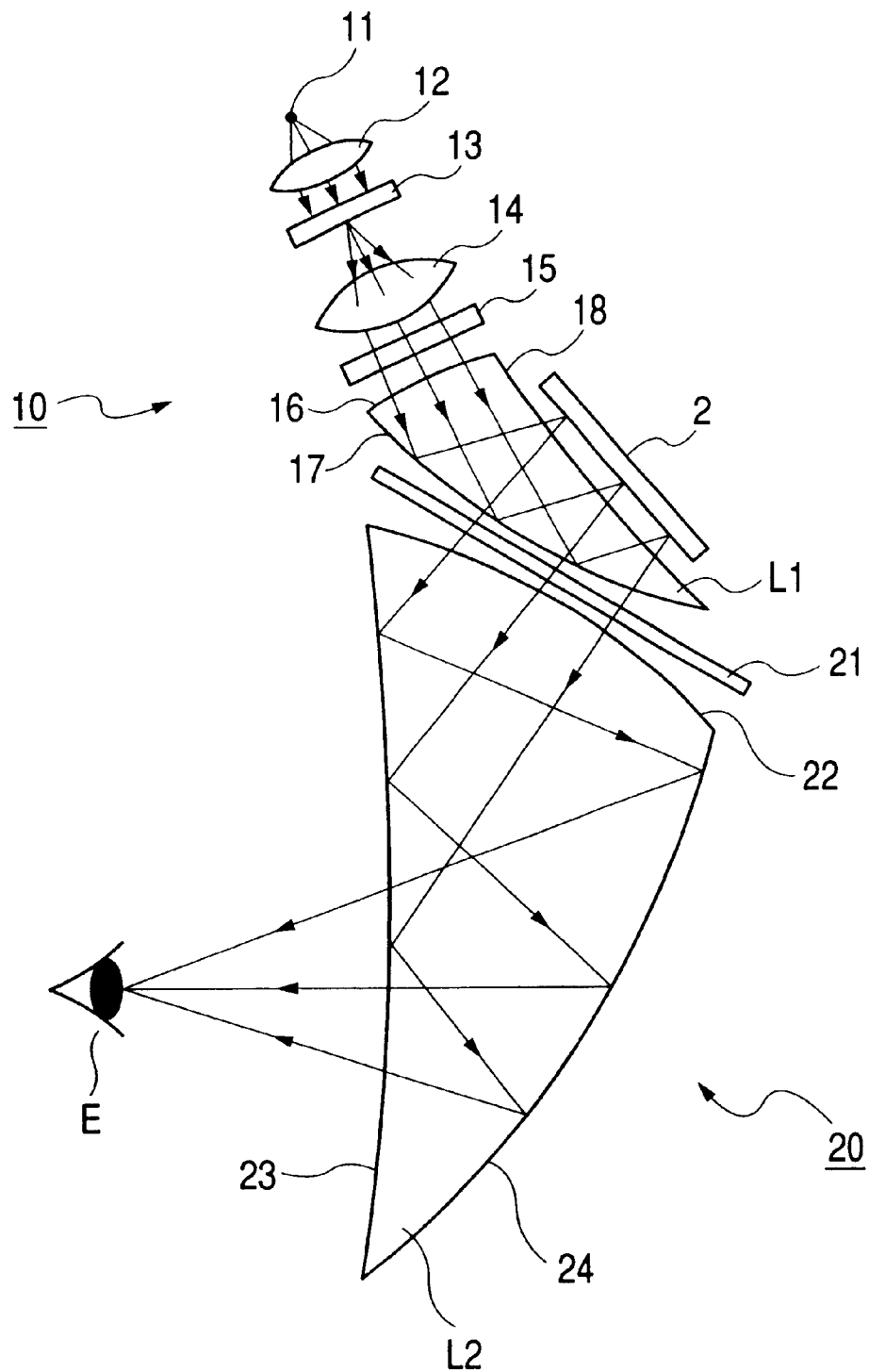
FIG. 4 is a schematic diagram of the major part of an embodiment according to an aspect of the present invention.

FIG. 4 is a schematic diagram of the major part of an embodiment according to an aspect of the present invention. An image display optical system of the present embodiment has an illumination optical system 10 composed of a light source 11, a condenser lens 12, a diffuser plate 13, a condenser lens 14, a polarizing plate 15, and a prism L1, and a display optical system 20 composed of a reflective display device (reflective display means) 2 such as a liquid crystal display or the like, the prism L1, a polarizing plate 21, and a prism L2.

Each of the elements will be described next.

The light emitted from the light source 11 comprised of an LED or the like is incident to the diffuser 13 while being condensed by the condenser lens 12, thereby forming a secondary light source. The light (divergent light) having passed through the diffuser 13 passes through the polarizer 15 while being condensed by the condenser lens 14. The light is converted into linearly polarized light by the polarizer 15 and the linearly polarized light is refracted by a surface (entrance surface) 16 to enter the prism L1. Part of the incident light is reflected by a half mirror surface 17 having a positive power, is refracted by a surface (exit surface) 18 while emerging from the prism L1, and then is incident to a display surface of the reflective display device 2 at a predetermined angle relative to the normal to the display surface. The surface 17 is constructed of a rotationally asymmetric surface with different powers depending upon the azimuths about the surface vertex thereof, whereby correction is made for various aberrations appearing due to the decentered arrangement of the optical system. Each of the surface 16 and the surface 18 is comprised of a plane, a curved surface, an aspherical surface, or a rotationally asymmetric surface or the like. The prism L1 is constructed with three or more optical surfaces including a decentered surface.

On the other hand, light transmitted by the half mirror surface 17 out of the light from the surface 16 is intercepted by the polarizing plate 21 whose axis of polarization is set perpendicular to that of the polarizing plate 15, whereby it is prevented from entering the prism L2. Since spreading of the illumination light is prevented by providing the surface 17 with the positive power, the size of the illumination optical system 10 is decreased thereby; for example, the condenser lens 14 of smaller outside diameter can be used.

The present embodiment employs a ferroelectric liquid crystal display as the reflective display means 2. Since the ferroelectric liquid crystal display has an excellent viewing angle property, a large angle can be set as an angle of incidence to or emergence from the display surface. This accomplishes the increase of the field of view and can enhance the effect of the present invention. The polarization direction of the linearly polarized light, which was made incident to the display surface of the reflective display means 2 by the illumination optical system 10, is selectively rotated according to a display image on the display means 2. When the display is off, the incident light is reflected while the direction of polarization is preserved. When the display is on, the incident light is reflected while the direction of polarization is rotated by 90°. Colors and gradations can be expressed, for example, by using LEDs of three colors of R (red), G (green), and B (blue) as the light source 11, switching the display in synchronism with emission of each LED, and controlling the light intensity of each LED.

Light emerging from (or reflected by) the display surface of the reflective display element 2 at a predetermined angle relative to the normal to the display surface, is refracted by the surface 18 to enter the prism L1, then is refracted by the half mirror surface 17 with the positive power to emerge from the prism L1, and then reaches the polarizer 21. The reflected light with the direction of polarization preserved by the display means 2 is intercepted by the polarizer 21. On the other hand, the light with the direction of polarization rotated by the display means 2 passes through the polarizer 21 and then is refracted by the surface 22 to enter the prism L2. The incident light is then incident to a surface 23 at an angle over the critical angle to be reflected totally. The reflected light is then reflected by a mirror surface 24 having a positive power and is incident again to the surface 23 at an angle below the critical angle. The light is refracted to emerge from the prism L2 and be guided to the observer's eye E. Each of the surfaces 17, 18, 22, 23, and 24 has an optical power and they form an enlarged virtual image of the display means 2. Each of the surfaces 22, 23, and 24 is constructed of a rotationally asymmetric surface with different powers depending upon the azimuths about the surface vertex thereof, whereby the various aberrations due to the decentered arrangement of the optical system can be corrected for by the small number of optical elements.

Figure 7:
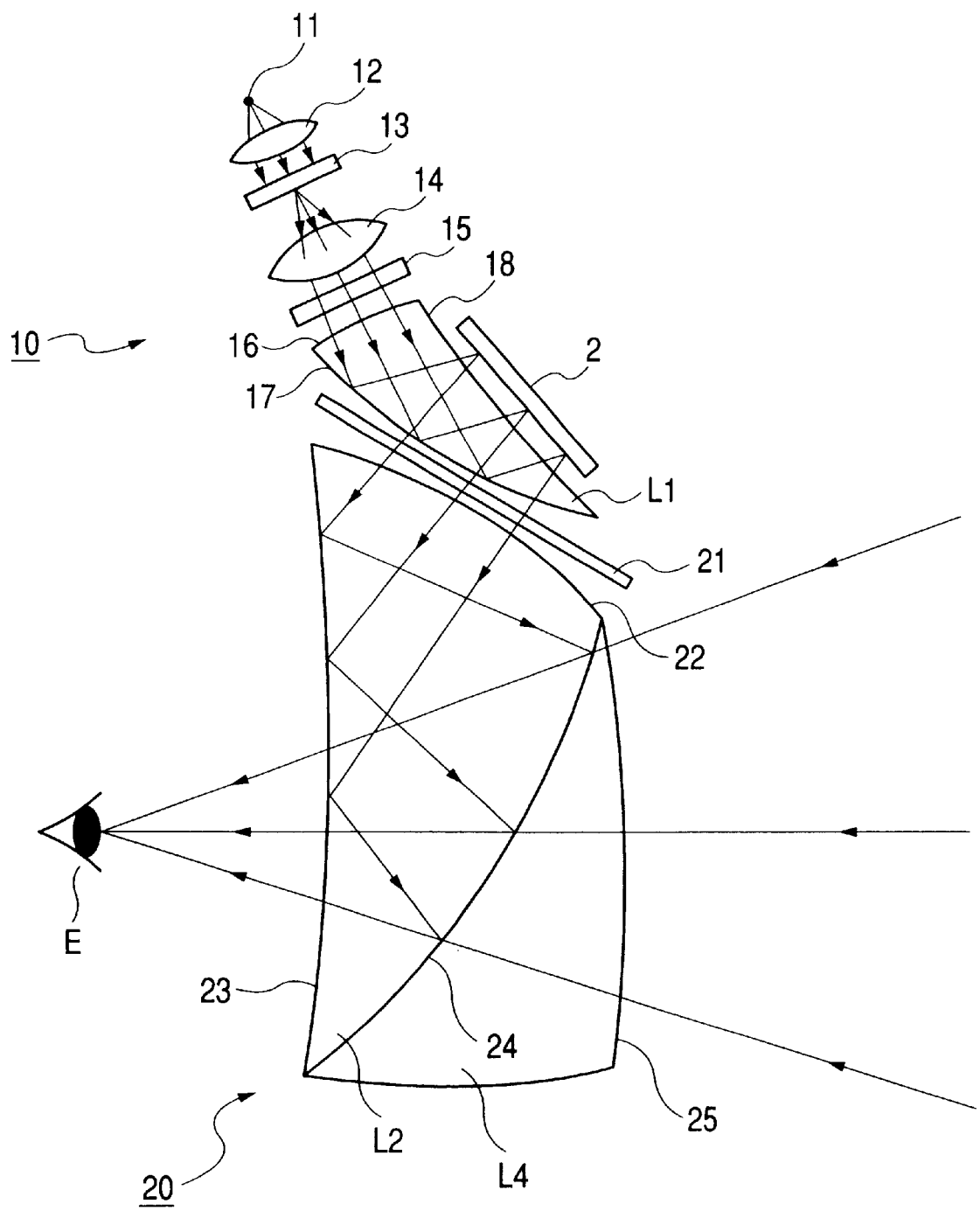
FIG. 7 is an explanatory diagram of another embodiment of the embodiment illustrated in FIG. 4.

In the present embodiment the apparatus may also be modified in such structure, as illustrated in FIG. 7, that the surface 24 is constructed of a half mirror surface, a prism L4 is joined to the surface 24, and the light from the image displayed on the display means 2 and the light from an image of the external field is guided through the prisms L4, L2 to the observer's eye E, so as to permit the observer to observe the both images. In FIG. 7 the optical system consisting of the surface 25, the surface 24, and the surface 23 constitutes an observation system for observing the image of the external field.

In the present embodiment, as described above, the illumination light is obliquely entered to and reflected from the display means 2, the illumination optical system 10 and the display optical system 20 share the optical element including the surfaces with power (the surface 18 and the surface 17), and the reflecting action and transmitting action are selectively used at one surface (the surface 17) forming the optical element. This allows the setting of the small space between the optical element and the display surface and accomplishes the compact optical system with a wide field of view.

In the present embodiment, in addition to the prism L2, each of the surfaces 17, 18 of the prism L1 bears the power, thereby decreasing the powers allocated to the respective surfaces composing the optical system. This also suppresses occurrence of aberration to a low level and also decreases partial charge for aberration correction of each surface, so as to relax tolerances, thereby facilitating manufacturing of the apparatus. Further, in the case of the display optical system being constructed of only the prism L2, if there is such a tendency that from the design aspect the power is too weak in the meridional direction (in the direction along the plane of the drawing in FIG. 4), the surface 17 will be constructed especially on the basis of an anamorphic surface with a stronger power in the meridional direction than in the sagittal direction (the direction normal to the plane of the drawing in FIG. 4), thereby improving the imaging performance. Each of the surfaces 17, 18 may also be constructed of a rotationally asymmetric surface with different powers depending upon the azimuths about the surface vertex, which can improve the imaging performance more.

Further, the present embodiment employs the two polarizing plates with the polarization axes thereof being perpendicular to each other, separately in the illumination optical system 10 and in the display optical system 20, but the present invention is not limited to this.

Figure 5:
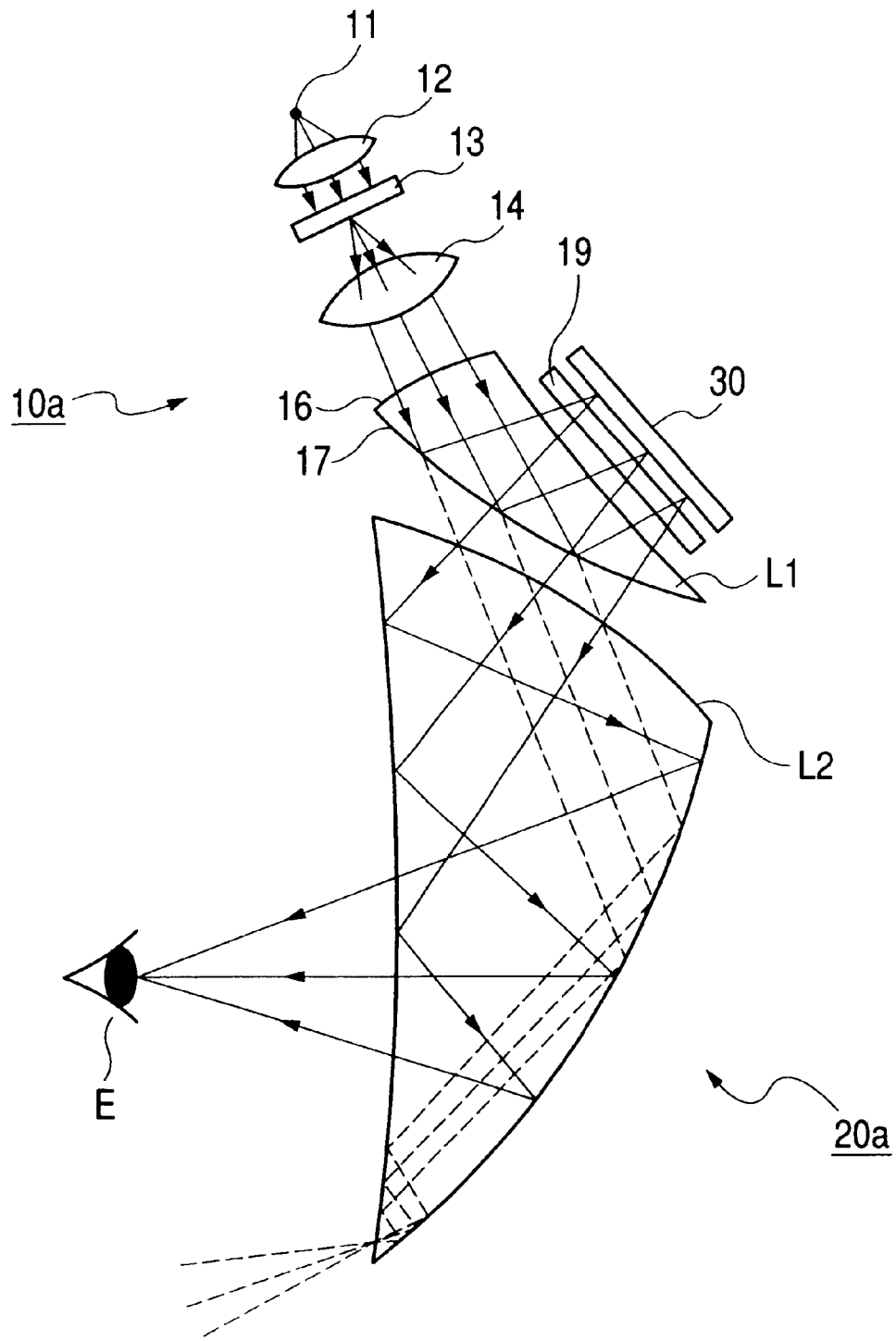
FIG. 5 is a schematic diagram of the major part of an embodiment according to an aspect of the present invention.

FIG. 5 is a schematic diagram of the major part of an embodiment according to a further aspect of the present invention. In the present embodiment one polarizing plate 19 is provided immediately before the reflective display element 2, as illustrated in FIG. 5. The embodiment illustrated in FIG. 5 has the same structure as the embodiment illustrated in FIG. 4, except that the polarizing plate 19 is placed instead of the polarizing plates 15, 21 and the reflective display means 30 replaces the reflective display means 2. Therefore, the elements having the same function are denoted by the same reference symbols and the description thereof is omitted herein.

The reflective display element 30 is different in control of polarization against incident light with on/off of display from the reflective display means 2. Namely, the linearly polarized light, which was made incident to the display surface of the reflective display means 30 by the illumination optical system 10a, is reflected with the polarization direction of the incident light being preserved when the display is made on by the reflective display means 30. When the display is off, the light is reflected while the direction of polarization is rotated by 90°. Therefore, in the on state of the display the light reflected by the reflective display means 30 can pass through the polarizing plate 19, whereas it is intercepted by the polarizing plate 19 in the off state. In the case of this structure, the surfaces of the prism L2 are constructed so that the light transmitted by the half mirror surface 17 out of the light from the surface 16 in the illumination optical system 10a is guided along directions off the observer's eye E, as indicated by the dashed lines in FIG. 5.

This structure allows the prism L1 to be made of a material with birefringence, and thus expands the range of selection of materials, thereby enabling further reduction of the scale and weight.

Figure 8:
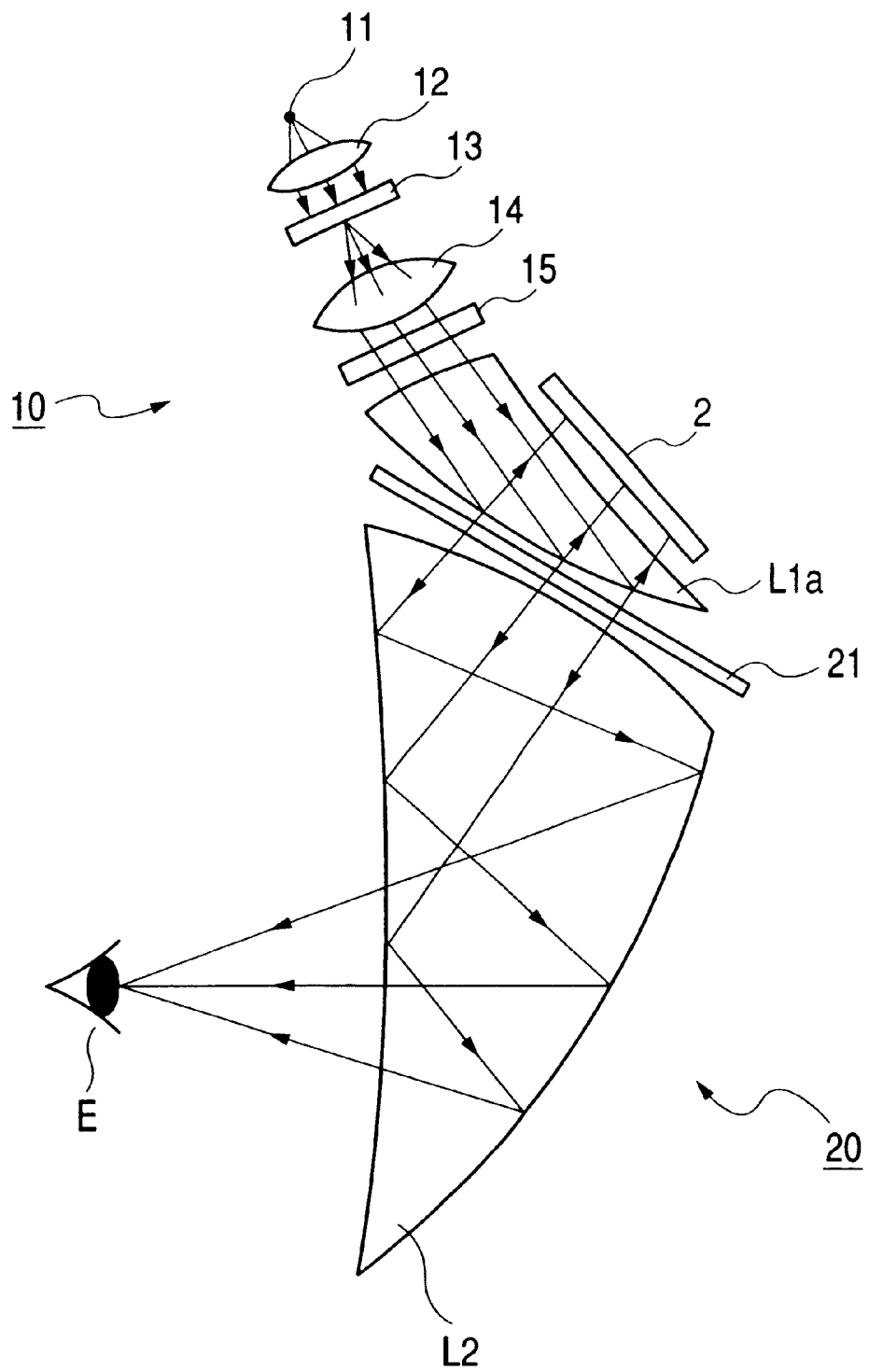
FIG. 8 is an explanatory diagram of another embodiment of the embodiment illustrated in FIG. 4.

In the present embodiment the illumination system is constructed so that the light therefrom is obliquely entered to and reflected from the display device, but it may also be constructed so that the illumination light is normally entered to and reflected from the display device, for example, as illustrated in FIG. 8. The embodiment illustrated in FIG. 8 has the same structure as the embodiment illustrated in FIG. 4, except that the prism L1a replaces the prism L1 whereby the illumination light is normally entered to and reflected from the display surface of the display means 2. Thus the elements having the same function are denoted by the same reference symbols and the description thereof is omitted herein. This structure slightly increases the space between the optical element and the display surface, when compared with that in the embodiment illustrated in FIG. 4, but this structure allows a display element with not so good viewing angle characteristic to be used as the display element 2.

Figure 6:
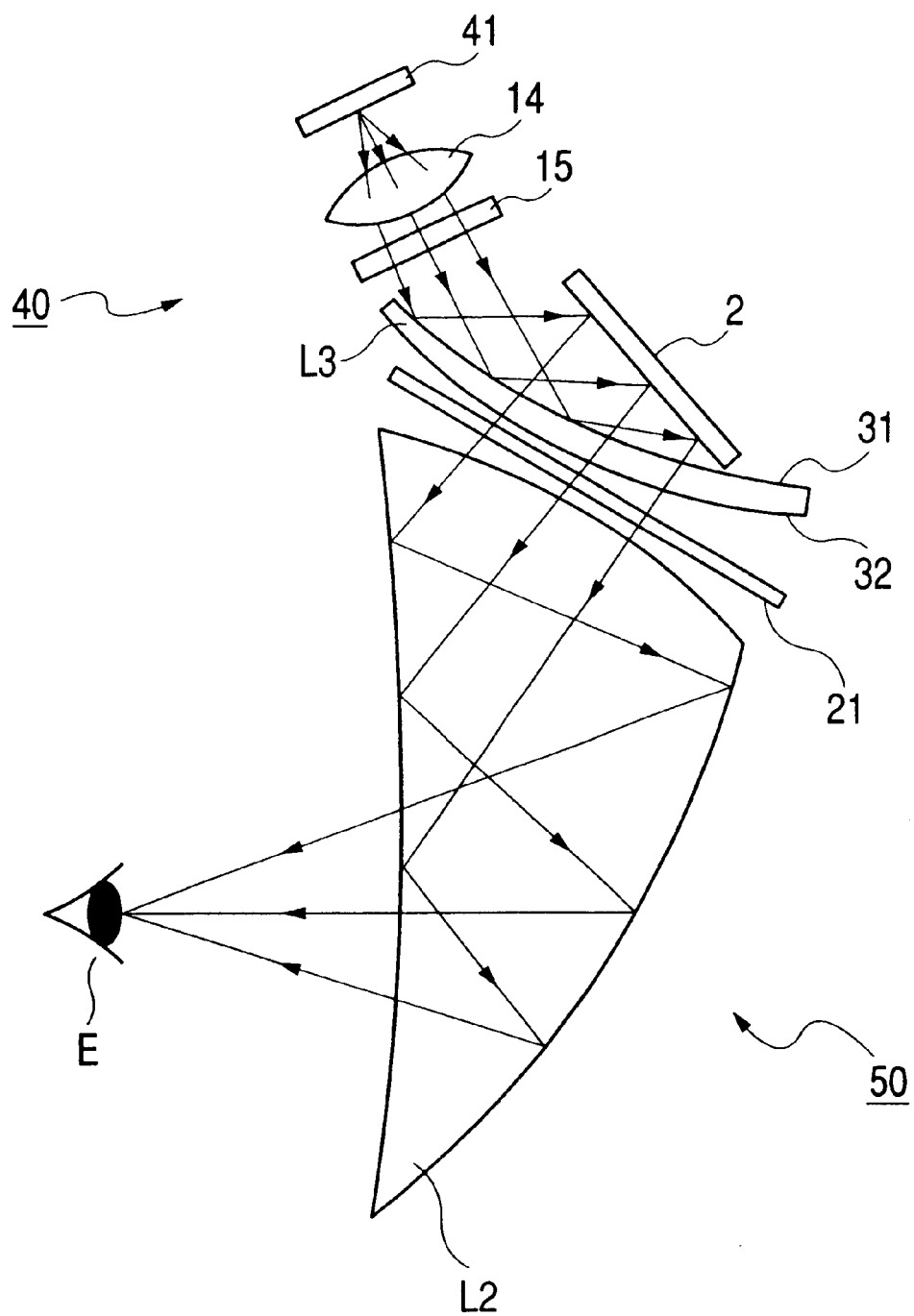
FIG. 6 is a schematic diagram of the major part of an embodiment according to an aspect of the present invention.

FIG. 6 is a schematic diagram of the major part of an embodiment according to a further aspect of the present invention. The image display apparatus of the present embodiment has the illumination optical system 40 composed of a surface light source 41, the condenser lens 14, the polarizing plate 15, and a lens L3 having a half mirror surface 31, and the display optical system 50 composed of the reflective display means 2 such as the liquid crystal display or the like, the lens L3, the polarizing plate 21, and the prism L2. The elements having the same function as in the embodiment illustrated in FIG. 4 are denoted by the same reference symbols and the description thereof is omitted herein.

The light emitted from the surface light source 41 such as a light guide plate, a surface light-emitting element, or the like travels through the polarizing plate 15 while being condensed by the condenser lens 14. The polarizer 15 converts the light into the linearly polarized light and part thereof is reflected by the half mirror surface 31 with a positive power of the lens L3. The reflected light is incident at a predetermined angle relative to the normal to the display surface, to the display surface of the reflective display device 2. The surface 31 is constructed of a rotationally asymmetric surface with different powers depending upon the azimuths about the surface vertex, whereby correction is made for the various aberrations due to the decentered arrangement of the optical system.

On the other hand, the light transmitted by the half mirror surface 31 out of the light from the polarizer 15 travels through a surface 32 and is intercepted by the polarizing plate 21 whose axis of polarization is perpendicular to that of the polarizing plate 15, whereby it is prevented from entering the prism L2.

The light, which emerges from (or is reflected by) the display surface of the reflective display means 2 at the predetermined angle relative to the normal to the display surface, is refracted by the lens L3 with the positive power (the surface 31 and the surface 32) and then reaches the polarizer 21. The light reflected with the direction of polarization being preserved by the display means 2 is intercepted by the polarizer 21. On the other hand, the light reflected with the direction of polarization being rotated by the display element 2 travels through the polarizer 21 and is guided through optical paths similar to those in the case of the embodiment illustrated in FIG. 4, to the observer's eye E, thereby forming an enlarged virtual image of the display element 2 thereon.

This structure can realize the compact optical system with the wide field of view as in the case of the embodiment illustrated in FIG. 4, can decrease the powers allocated to the respective surfaces constituting the optical system, can suppress occurrence of aberration to a low level, can also decrease partial charge for aberration correction of each surface, and can relax tolerances, thus facilitating manufacturing.

The present embodiment can also employ the structures as illustrated in FIG. 5 and FIG. 7, of course, and it is thus noted that the structures of the present invention are not restricted by the placement of the polarizing plate(s) and the display method of the reflective display device. For example, when a liquid crystal display of the nematic type is used as the display means, it becomes possible to control angles of rotation of polarization and thus gradations can be achieved by the angles of rotation of polarization. This can decrease the driving frequency of liquid crystal to a lower level.

In the present embodiment the LED or the surface light source was used as the light source means, but the apparatus may also be constructed so as to make use of external light.

Figure 9:
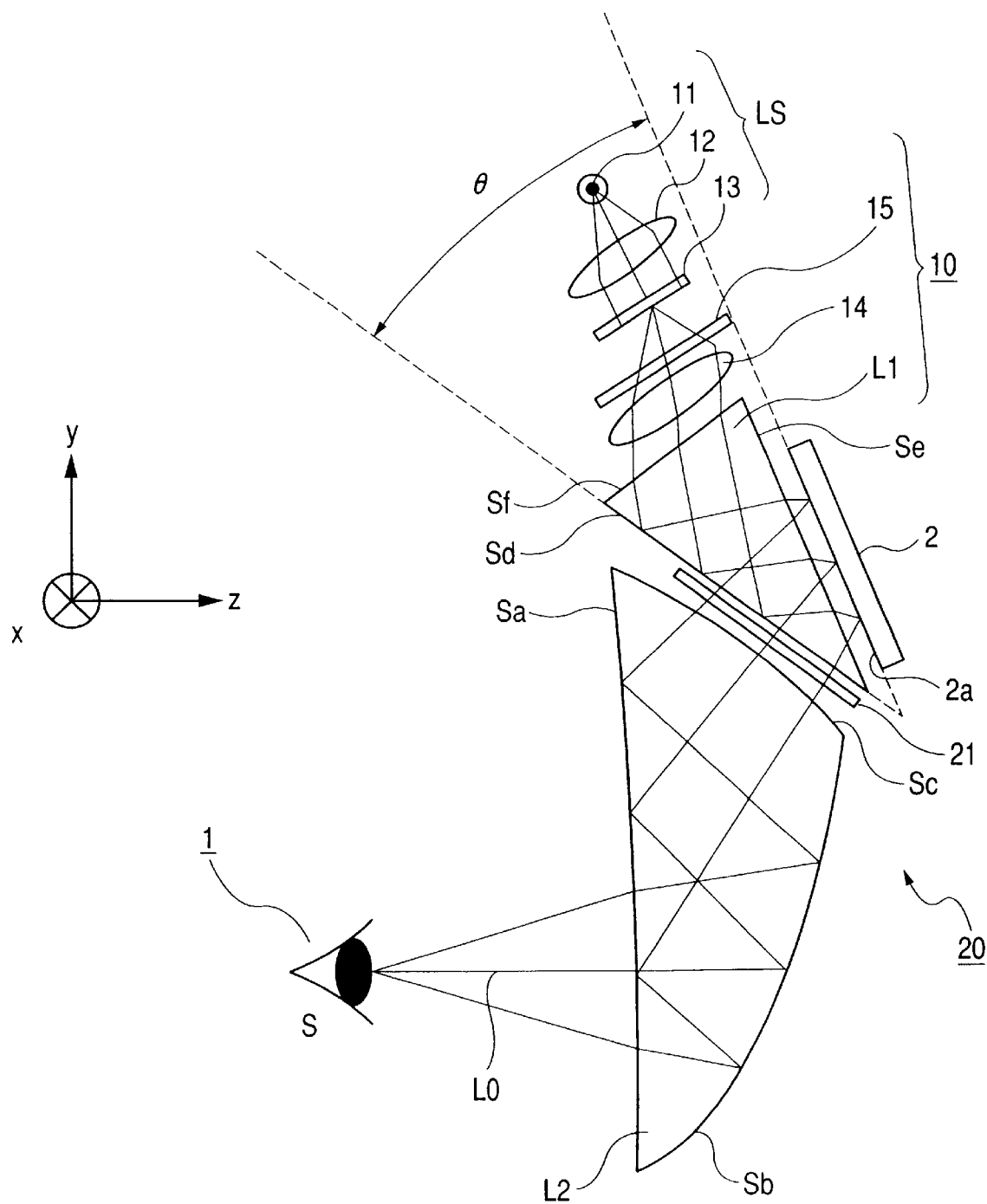
FIG. 9 is a schematic diagram of the major part to show the basic structure of the image display apparatus according to a further aspect of the present invention.

FIG. 9 is a schematic diagram of the major part to show the basic structure of the image display apparatus according to a further aspect of the present invention. In the figure L2 represents an optical element constituting part of the display optical system (enlarging optical system), which has the first, second, and third optical surfaces (which will also be referred to as "surfaces") Sa, Sb, Sc each comprised of a plane, a curved surface, an aspherical surface, or a rotationally asymmetric surface or the like. Each surface Sa, Sb, or Sc has a symmetric shape with respect to one YZ plane (a symmetry plane, which corresponds to the plane of the drawing in the present embodiment). The optical element may also be arranged to have three or more surfaces. S indicates the exit pupil formed by the display optical system which is the desired pupil position of the observer 1.

Numeral 2 denotes the image display means (display device) comprised of a reflective LCD, and 2a does a display surface (liquid crystal surface) thereof. Since the apparatus is constructed in such structure that the light from the illumination optical system LE is incident obliquely to the LCD 2 to be reflected and that the light obliquely emerging therefrom is guided to the enlarging optical system (display optical system) as described below, the image display means 2 in the present invention needs to have a wide viewing angle characteristic. In order to meet this need, for example, the ferroelectric liquid crystal (FLC) is used. The image display means may also be constructed using the TN liquid crystal or the like with an improved viewing angle characteristic in combination with a phase compensator.

LS represents the light source means which consists of a light source 11, lens 12, and diffuser 13. A light from the light source 11 is condensed by the lens 12 and is diffused by the diffusing plate (diffuser) 13. The light source 11 such as an LED or the like which emits monochromatic light may be used in case of monochromatic display by the LCD2. Further, the light source 11 in which LEDs emitting three color lights of red, green and blue are formed on one chip may be used in case of color display by the LCD 2. The LEDs for emitting the three colors of R, G, and B are controlled to emit light in synchronism with the display of image on the reflective LCD 2, so as to enable to display a color image.

Numeral 10 indicates the illumination optical system, which is composed of the lens 14 for condensing the light from the light source means LS through the polarizing plate 15, and the prism (optical member) L1 of the triangular prism shape for guiding the light transmitted by the lens 14 to the display surface 2a of the LCD 2. The surfaces Sd, Se forming the prism L1 also function as part of the display (enlarging) optical system 20 for guiding the light from the reflective LCD 2 to the pupil. The angle θ between the reflecting surface Sd of the prism L1 and the display surface 2a of the LCD 2 is set to be less than 45° The prism vertex angle Pθ of the prism L1 is set to satisfy the following condition:

$(Dy/Ly) \cdot Wy° < P\theta < 40°$ where Dy: the pupil diameter of the display optical system in the direction of the y-axis, Ly: the length in the y-direction of the effective display area of the LCD, and Wy: the view angle in the y-direction of the display device.

The angles over the upper limit are not preferable, because the prism L1 becomes thick, while the angles below the lower limit are not preferable, either, because part of the illumination light is also totally reflected by the surface Se and an eclipse can occur when the observer intends to gaze at the peripheral part of the image.

The lens 14 is not limited to a single lens, but may also be composed of a plurality of lenses or concave mirrors or the like. As exemplified in numerical examples described hereinafter, the lens 14 and the prism L1 may be joined to each other to compose one component.

Numerals 15 and 21 denote polarizing plates, which are arranged so that their axes of polarization are approximately perpendicular to each other, for example. It is noted here that the polarizing plates 15, 21 do not always have to be placed perpendicular to each other but they may be arranged in placement suitable for design conditions including the optical rotatory power of the LCD 2, the display mode, and so on. There are also cases wherein only one polarizing plate immediately before the display surface 2a suffices depending upon the type of the LCD 2 or the like, and thus the two polarizing plates are not essential. The polarizing plate 15 may also be placed between the lens 14 and the prism L1.

The third optical surface Sc in the optical element L2 has the shape of an aspherical surface symmetric with respect to the symmetry plane (YZ plane). The first optical surface Sa has the shape of a spherical surface or an aspherical surface symmetric with respect to the symmetry plane (YZ plane), and is placed in an inclined state at such an angle as to totally reflect the light refracted by the third optically acting surface Sc.

The second optical surface Sb is a mirror surface (with reflection film thereon) comprised of an aspherical surface of a strongly concave surface as a whole with respect to the symmetry plane (YZ plane), and is inclined relative to the light totally reflected by one area of the first optically acting surface Sa. The light reflected by the second optically acting surface Sb travels through the first optically acting surface Sa to reach the pupil S.

Let us define a reference ray L0 as a ray connecting approximate center positions of the light source means LS, the image display means 2, and the pupil formed by the display optical system (enlarging optical system) 20. Then each of the surfaces Sa, Sb acting at least as a reflecting surface, out of the optical surfaces constituting the display optical system, is constructed of a surface inclined (or decentered) with respect to the reference ray L0, whereby the optical element L1 is made thin in the direction of the z-axis. The reference ray L0 forms a principal ray at the center of the field of view of the display optical system (which will be referred to as a center principal ray).

In order to correct for decentering aberration due to the inclined arrangement of the surfaces Sa, Sb with curvature relative to the reference ray L0, the surfaces Sa to Sc are constructed of rotationally asymmetric surfaces with different curvatures depending upon azimuths.

Next described is the optical action in the basic structure of the embodiment of the present invention illustrated in FIG. 9. As illustrated in FIG. 9, the light from the light source LS is aligned into a direction of polarization (for example, into s-polarized light) by the polarizing plate 15 and then the light is condensed by the lens system 14 comprising the illumination optical system 10. Then the light is incident through the entrance surface Sf of the prism L1 thereinto and is then reflected totally by the reflecting surface Sd. The reflected light emerges from the transmitting surface Se to illuminate the LCD 2 obliquely in the yz plane with respect to the normal to the display surface 2a of the LCD 2.

The light, which was modulated (properly rotated by each pixel) according to the image information and reflected by the display surface 2a of the LCD 2, is then incident through the surface Se again into the prism L1 and travels this time through the surface Sd, which acted as a totally reflecting surface upon illumination, to emerge from the prism L1 toward the polarizing plate 21. The polarizing plate 21, for example, intercepts the s-polarized light from pixels without being rotated by the image display means 2, but transmits the p-polarized light from pixels with being rotated 90° by the LCD 2, thereby guiding the light to the optical element L2. The light first travels through the third optical surface Sc toward the first optical surface Sa to be reflected totally by this surface Sa. The reflected light travels toward the second optical surface Sb and is reflected into convergent light by this surface Sb. The convergent light again travels toward the first optical surface Sa and travels this time through this surface Sa to form a virtual image of the image displayed on the image display means 2 and reach the pupil S of the observer 1, whereby the observer is allowed to view the virtual image of the image information displayed on the liquid crystal display means 2.

According to the present invention, as described above, the reflecting surface Sd of the prism L1 for guiding the illumination light to the LCD 2 is set at the angle less than 45° (preferably in the range of (Dy/Ly)·Wy° to 40°) with respect to the display surface 2a of the display element 2, whereby the distance from the LDC 2 to the optical element L2 forming the display optical system (enlarging optical system) is decreased, when compared with the system incorporating the conventional 45° mirror. This enables to accomplish the compact and thin image display optical system while maintaining the sufficient field of view and eye relief in the structure incorporating the reflective display device and the light source and illumination optical system for illuminating it.

According to the present invention, as described above, the apparatus has the prism L1 with the surface Sd acting as a totally reflecting surface in the illumination optical system and acting as a transmitting surface in the display (enlarging) optical system, whereby the light from the light source 11 is guided to the observer's pupil S without passing through a half mirror or the like, thereby enabling to provide the bright image display optical system with high utilization efficiency of light.

Figure 12:
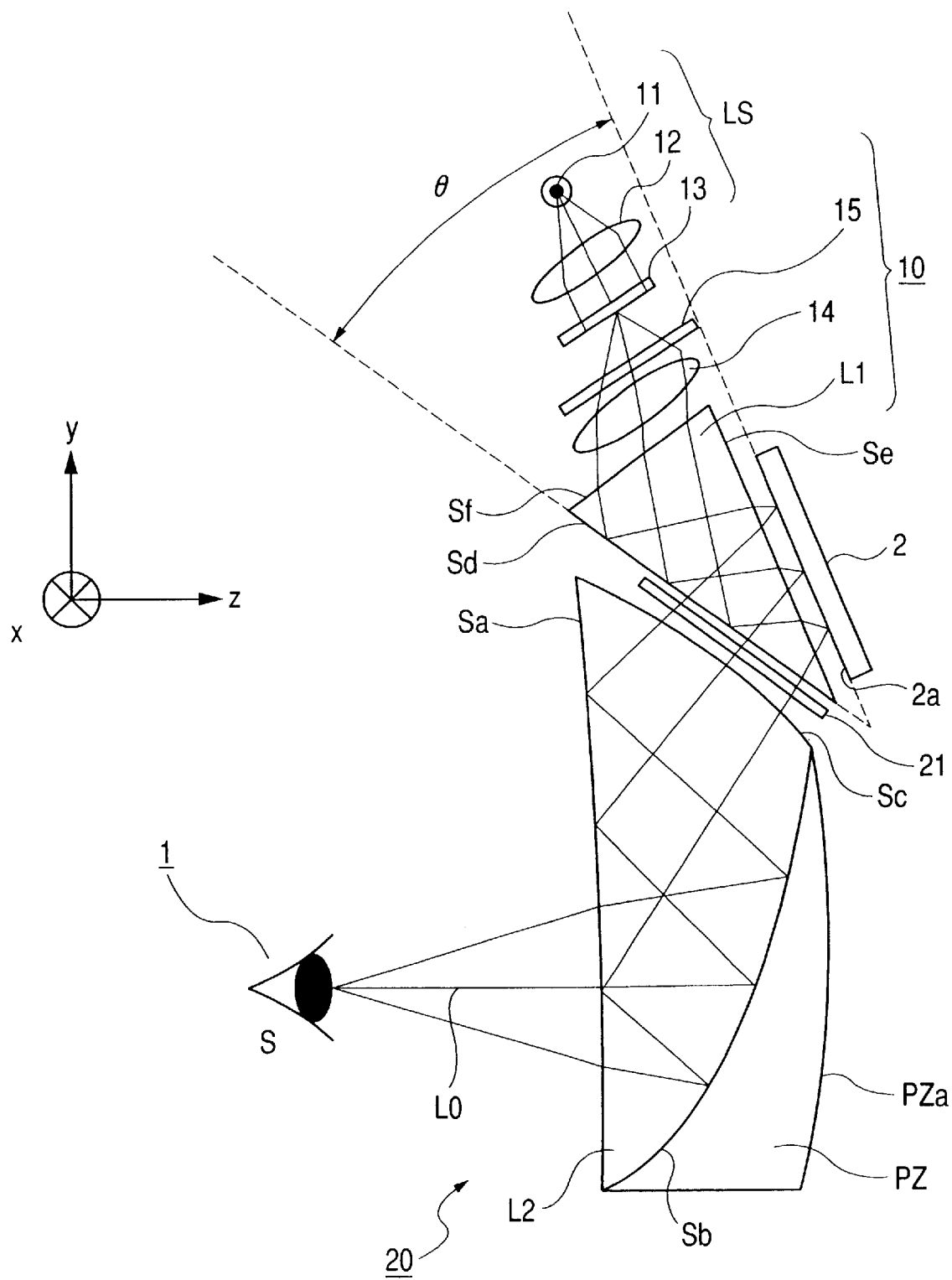
FIG. 12 is a schematic diagram of the major part of an embodiment according to a further aspect of the present invention.

In the basic structure of the present invention of FIG. 9, the apparatus may also be modified in such structure, as illustrated in FIG. 12, that the surface Sb of the optical element L2 is constructed of a half mirror surface, a prism PZ is joined to the surface Sb, and the light from the image displayed on the display means 2 and the light from the image of the external field is guided through the prism PZ and the optical element L2 to the observer's pupil S, so as to allow the observer to observe the both images. In FIG. 12 the optical system composed of a surface PZa, the surface Sb, and the surface Sa constitutes an observation system for observing the image of the external field.

The structure of a further embodiment based on the present invention will be described below.

Figure 10:
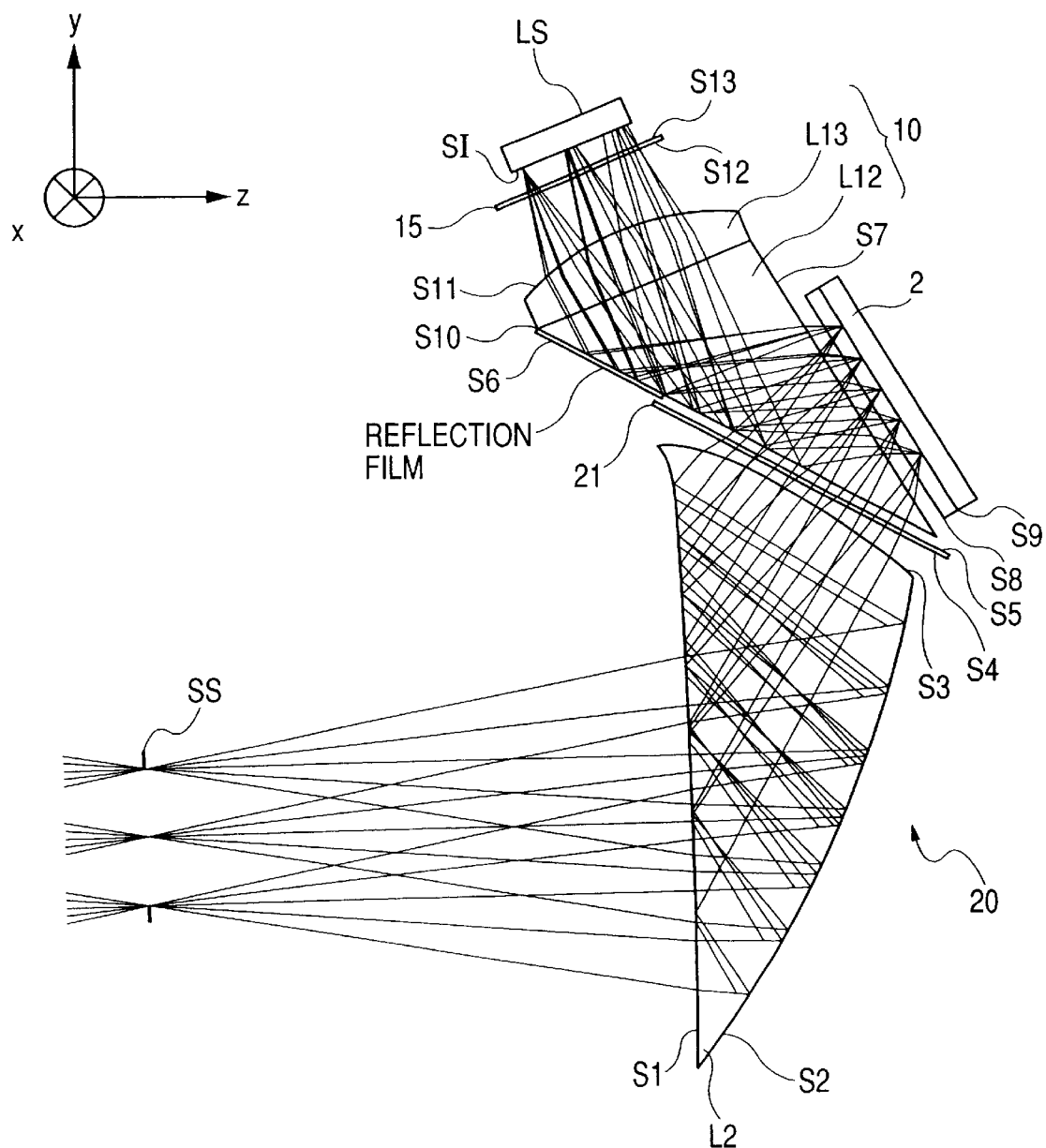
FIG. 10 is a schematic diagram of the major part of an embodiment according to a further aspect of the present invention.

FIG. 10 is a structural diagram of the major part of an embodiment according to an aspect of the present invention. In the drawing, SS represents the pupil formed by the display (enlarging) optical system, and L2 an optical element, which has the first, second, and third optically acting surfaces (hereinafter also referred to as "surfaces") S1, S2, and S3 comprised of rotationally asymmetric surfaces. All the surfaces are symmetric with respect to one YZ plane (the symmetry plane, which corresponds to the plane of the drawing in the present embodiment).

Numeral 2 denotes a reflective LCD, S9 a display surface of the reflective LCD 2, and S8 a front surface of a cover glass of the LCD.

Numeral 10 designates the illumination optical system, in which a prism L12 of the triangular prism shape and a lens L13 of the plano-convex shape as optical members are joined to each other. S6 represents an optically acting surface which acts as a reflection surface in the illumination optical system and which acts as a transmitting surface in the display (enlarging) optical system. The surface S6 has a reflection film in part and is arranged to totally reflect the illumination light from the light source LS in the other portions than the reflection film. S7 denotes a surface acting as a transmitting surface in the both of the illumination optical system and the display optical system, S10 a transmitting surface as a joint surface between the triangular prism L12 and the lens L13, and S11 a transmitting surface with a positive power forming the lens L13.

LS indicates a surface light source, which can be one properly selected from the surface light source constructed by placing the light emitting element and optical system on the back surface of the diffuser plate as described in the basic structure of the present invention, the combination of the light guide plate with the light emitting element placed on the side like the known back light source for transmission type LDC or the like, and the surface light-emitting light sources such as EL (electro luminescent) lamps or the like. For the color display, the apparatus can be constructed in structure using the elements with the R, G, and B-emitting mechanisms and controlling the emission of the elements so that the R, G, and B emission of the elements is synchronized with the R, G, and B display on the LCD 2. SI represents the light emitting surface (or a diffusing surface) of the surface light source LS.

Numerals 15 and 21 denote the polarizing plates whose axes of polarization are approximately perpendicular to each other. The polarizing plate 15 has optical surfaces S12, S13, and the polarizing plate 21 has optical surfaces S4, S5.

The aspherical shape of each optical surface S1 to S3 of the optical element L2 in the present embodiment is expressed using the following equation.

coordinate system (note: the x-coordinate and rotation amounts about the y- and z-axes are always 0).

In the data listed below, R represents the radius of curvature of a surface of interest, and Nd and Vd represent the refractive index and Abbe's number after the surface of interest. If light travels plural times through a single surface the data listed will represent those on the medium side except for air. If a surface is used as a reflecting surface they will not be given.

Each surface having the aspherical coefficients C1, C2, ... is an aspherical surface (rotationally asymmetric surface) according to the aspherical equation defined in the present embodiment, a surface with Rx is a toric surface, and each surface without these indications is a spherical surface. In a surface with the indication of aspherical coefficients, those not indicated are all 0.

| | Y | Z | A |
|---|---|---|---|
| SS | 0.000 | 0.000 | 0.00 |
| | R: ∞ | | |
| S1 | −21.055 | 22.714 | −4.90 |
| | R: −286.387 | Nd: 1.5709 | Vd: 33.8 |
| | C1: 5.6951E + 01 | C5: 1.2624E − 03 | C6: −1.0259E − 05 |
| | C10: −1.0063E − 05 | C11: −1.1861E − 04 | C12: −1.2583E − 06 |
| | C13: −8.1437E − 08 | C14: −1.5282E − 07 | C20: −3.6312E − 09 |
| | C21: −6.6657E − 09 | C22: −1.2994E − 08 | C23: −1.8270E − 10 |
| | C24: 3.2026E − 11 | C25: −3.3331E − 11 | C26: 1.7955E − 11 |
| S2 | −7.684 | 25.621 | −34.58 |
| | R: −60.499 | | |
| | C1: 2.9063E + 00 | C5: −1.8798E − 03 | C6: −1.5350E − 03 |
| | C10: −2.1037E − 05 | C11: −4.2092E − 05 | C12: −1.4078E − 06 |
| | C13: −8.7082E − 07 | C14: 4.9603E − 07 | C20: −1.7039E − 08 |
| | C21: −6.7412E − 09 | C22: 2.8031E − 08 | C23: 4.2253E − 10 |
| | C24: −1.2736E − 10 | C25: 2.2765E − 10 | C26: 8.1350E − 11 |
| S3 | 13.586 | 29.712 | 57.62 |
| | R: ∞ | 0.000000 | |
| | C1: −1.0721E − 13 | C5: 3.4255E − 03 | C: −6.4961E − 03 |
| | C10: 1.0928E − 03 | C11: −1.0503E − 03 | C12: −3.8101E − 06 |
| | C13: −1.3683E − 06 | C14: 4.6612E − 06 | C20: −7.4127E − 06 |
| | C21: 7.8218E − 06 | C22: −7.1810E − 06 | C23: −1.2202E − 07 |
| | C24: 5.3625E − 08 | C25: −1.3562E − 07 | C26: 1.6849E − 08 |
| S4 | 13.083 | 31.875 | 60.21 |
| | R: ∞ | | |
| S5 | 13.257 | 31.974 | 60.21 |
| | R: ∞ | | |

$$z: = (1/R)*(x^2+y^2)/(1+(1-(1+C1)*(1/R)^2*(x^2+y^2))^{(1/2)})+c2+c4*y+C5*(x^2-y^2)^{+C6*(-1+2*x^2}+2*y^2)+C10*(-2*y+3*x^2*y+3*y^3)+C11*(3*x^2y-y^3)+C12*(x^4-6*x^2*y^2+y^4)+C13*(-3*x^2+4*x^4+3*y^2-4*y^4)+C14*(1-6*x^2+6*x^4-6*y^2+12*x^2*y^2+6*y^4)+C20*(3*y-12*x^2*y+10*x^4*y-12*y^3+20*x^2*y^3+10*y^5)+C21*(-12*x^2*y+15*x^4y+4*y^3+10*x^2*y^3-5*y^5)+C22*(5*x^4*y-10*x^2y^3+y^5)+C23*(x^6-15*x^4y^2+15*x^2y^4-y^6)+C24*(-5*x^4+6*x^6+*x^2*y^2-30*x^4*y^2-5*y^4-30*x^2*y^4+6*y^6)+C25*(6*x^2-20*x^4+15*x^6-6*y^2+15*x^4*y^2+20*y^4-15*x^2*y^4-15*y^6)+C26*(-1+12*x^2-30*x^4+20*x^6+12*y^2-60*x^2*y^2+60*x^4*y^2-30*y^4+60*x^2*y^4+20*y^6).$$

The data of the optical system in the present embodiment will be described below. The data will be expressed by defining a reference coordinate system as a coordinate system having the origin (0, 0, 0) at the center of the pupil SS of the display optical system and the direction of the z-axis illustrated along the optical axis and indicating Y, Z, and A as a y-coordinate, a z-coordinate, and an angle of rotation about the x-axis (whose positive direction is the counterclockwise direction on the plane of the drawing and whose unit is degrees) of a relative position of a coordinate system that defines each surface with respect to the reference -continued

| | Y | Z | A |
|---|---|---|---|
| S6 | 13.604 | 32.173 | 60.21 |
| | R: ∞ | Nd: 1.5163 | Vd: 64.1 |
| S7 | 15.140 | 33.052 | 29.82 |
| | R: ∞ | | |
| S8 | 15.463 | 33.616 | 29.82 |
| | R: ∞ | Nd: 1.5740 | Vd: 55.0 |

-continued

| | Y | Z | A |
|---|---|---|---|
| S9 | 15.798 | 34.201 | 29.82 |
| | R: ∞ | | |
| S10 | 25.650 | 27.285 | 112.08 |
| | R: ∞ | Nd: 1.6968 | Vd: 55.5 |
| S11 | 25.933 | 21.066 | 112.08 |
| | R: −10.806 | | |
| S12 | 28.713 | 19.939 | 112.08 |
| | R: ∞ | Nd: 1.4900 | Vd: 50.0 |
| S13 | 28.898 | 19.863 | 112.08 |
| | R: ∞ | | |
| SI | 29.825 | 19.487 | 112.08 |
| | R: ∞ | | | y-directional pupil diameter Dy: 6.00
y-directional LCD screen size Ly: 6.32
y-directional view angle Wy: 21.2°
angle θ between surface S6 and surface S9: 30.39°
vertex angle Pθ of prism L21: 30.39°
(Dy/Ly) · Wy° = 20.13°
∴(Dy/Ly) · Wy° < θ < 40°
(Dy/Ly) · Wy° < Pθ < 40°

The optical action in the present embodiment will be described next. As illustrated in FIG. 10, only the linearly polarized component of a specific direction, out of the light from the light emitting surface SI of the surface light source LS, is transmitted by the surfaces S13, S12 of the polarizing plate 15. The transmitted light of the linearly polarized component is refracted and condensed by the convex surface S11 and is transmitted by the surface S10. Part of the light is reflected by the reflection film of the surface S6 and the rest is totally reflected to travel through the surface S7 toward the LCD 2 to reach the image display surface S9 through the front surface of the cover glass S8, thus illuminating the reflective LCD 2.

The light modulated and reflected by the LCD 2 travels through the front surface of the cover glass S8 and through the surface S7 and the surface S6 of the triangular prism L12, and only light of the polarization component perpendicular to the axis of polarization of the polarizing plate 15 travels through the surfaces S5, S4 of the polarizing plate 21 in accordance with the degree of modulation. The transmitted light travels through the third optical surface S3 of the optical element L2 toward the first optical surface S1 to be totally reflected by this surface S1 toward the second optical surface S2. The light is reflected into convergent light by this surface S2 and the convergent light again travels toward the first optical surface S1. Then the light is transmitted this time by this surface S1 to form a virtual image of the image displayed on the display element 2 and form the pupil (exit pupil of the display optical system) SS.

In the present embodiment part of the illumination light is reflected and the rest is totally reflected by the surface S6 of the prism L12, whereby degrees of freedom of design can be increased with relaxing constraints on design. When the illumination system is constructed by joining the prism L12 to the lens L13 as in the present embodiment, the structure presents the advantage of the decreased number of man-hours for assembly.

Figure 11:
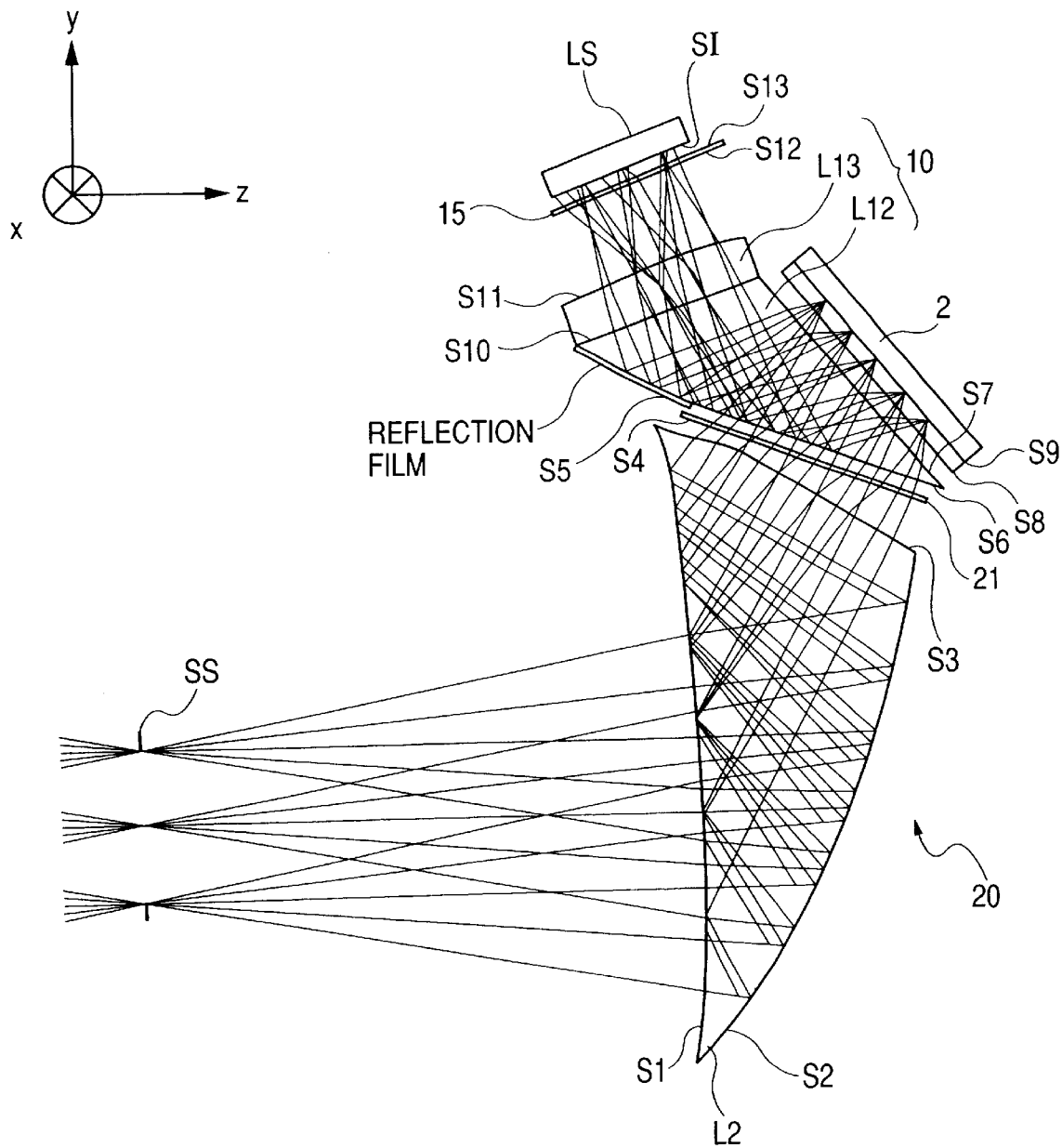
FIG. 11 is a schematic diagram of the major part of an embodiment according to a further aspect of the present invention.

FIG. 11 is a structural diagram of the major part of an embodiment according to a further aspect of the present invention. In the drawing, SS represents the pupil formed by the display (enlarging) optical system, and L2 an optical element, which has the first, second, and third optical surfaces (hereinafter also referred to as "surfaces") S1, S2, and S3 comprised of rotationally asymmetric surfaces. All the surfaces are symmetric with respect to one YZ plane (the symmetry plane, which corresponds to the plane of the drawing in the present embodiment).

Numeral 2 denotes a reflective LCD, S9 a display surface of the reflective LCD 2, and S8 a front surface of a glass cover of the LCD.

Numeral 10 designates the illumination optical system, in which the prism (optical member) L12 and the lens L13 are joined to each other. S6 represents an optically acting surface which acts as a reflecting surface in the illumination optical system and which acts as a transmitting surface in the display (enlarging) optical system. The surface S6 has a reflection film in part and is arranged to totally reflect the illumination light from the light source in the other portions than the reflection film. S7 denotes a surface acting as a transmitting surface in the both of the illumination optical system and the display optical system, S10 a transmitting surface as a joint surface between the prism L12 and the lens L13, and S11 a transmitting surface of a toric surface shape with a positive power forming the lens L13.

LS indicates a surface light source, which can be one properly selected from the surface light source constructed by placing the light emitting element and optical system on the back surface of the diffuser plate as described in the basic structure of the present invention, the combination of the light guide plate with the light emitting element placed on the side like the known back light source for transmission type LCD or the like, and the surface light-emitting light sources such as the EL lamps or the like. For the color display, the apparatus can be constructed in structure using the elements with the R, G, and B-emitting mechanisms and controlling the emission of the elements so that the R, G, and B emission of the elements is synchronized with the R, G, and B display on the LCD 2. SI represents the light emitting surface (or the diffusing surface) of the surface light source LS.

Numerals 15 and 21 denote the polarizing plates whose axes of polarization are approximately perpendicular to each other. The polarizing plate 15 has optical surfaces S12, S13, and the polarizing plate 21 has optical surfaces S4, S5.

The aspherical shape of each optical surface S1 to S3 of the optical element L2 in the present embodiment is expressed using the following equation.

$$z: = 1/2*(1/a+1/b)*(y^2*(\cos(w))^2+x^2)/\cos(w)/(1+1/2*(1/a-1/b)*y*\sin(w)+(1+(1/a-1/b)*y*\sin(w)-(1/a/b+1/4*(\tan(w))^2*(1/a+1/b)^2)*x^2)(\frac{1}{2}))+C2O*x^2+C11*x*y+C02*y^2+C30*x^3+C21*x^2*y+C12*x*y^2+C03*y^3+C40*x^4+C31*x^3*y+C22*x^2*y^2+C13*x*y^3+C04*y^4+\ldots$$

The data of the optical system of the present invention will be listed below. The notation for description of the data follows that in the embodiment illustrated in FIG. 10.

| | Y | Z | A |
|---|---|---|---|
| SS | 0.000 | 0.000 | 0.00 |
| | R: ∞ | | |
| S1 | 0.705 | 22.097 | 2.03 |
| | R: ∞ | | |
| | Nd: 1.5709 | Vd: 33.8 | |
| | a: −1.6001E − 03 | b: −2.0700E − 03 | w: 7.6561E + 01 |
| | C02: −1.2865E − 03 | C03: 3.1005E − 04 | C04: −1.7122E − 05 |
| | C05: 6.5409E − 07 | C06: −9.2795E − 08 | C20: −5.2450E − 03 |
| | C21: 3.0453E − 05 | C22: −3.9978E − 05 | C23: 4.3388E − 07 |
| | C24: 1.9170E − 08 | C40: −7.5988E − 06 | C41: −1.9544E − 06 |
| | C42: −7.0198E − 08 | C60: −3.0370E − 08 | |
| S2 | 0.016 | 28.019 | −24.09 |
| | R: ∞ | | |
| | a: −2.1136E − 02 | b: −2.5257E − 02 | w: −3.1945E + 01 |
| | C02: −2.8889E − 04 | C03: −1.4933E − 04 | C04: −15.6307E − 06 |
| | C05: 1.2648E − 06 | C06: −9.4413E − 08 | C20: −1.8636E− 03 |
| | C21: −3.3320E − 05 | C22: −7.9416E − 06 | C23: 8.7542E − 07 |
| | C24: −7.7610E − 08 | C40: −2.9596E − 06 | C41: −3.8702E − 07 |
| | C42: −4.5477E − 09 | C60: −1.0830E − 08 | |
| S3 | 13.307 | 26.240 | 57.17 |
| | R: ∞ | | |
| | a: 5.5954E − 04 | b: 3.5851E − 03 | w: −8.4177E + 01 |
| | C02: 2.2738E − 02 | C03: −7.4198E − 03 | C04: −3.0192E − 03 |
| | C05: 1.4405E − 04 | C06: 6.0690E − 05 | C20: 5.4887E − 03 |
| | C21: −5.9630E − 04 | C22: 2.7278E − 04 | C23: 5.4823E − 05 |
| | C24: −6.4480E − 06 | C40: −2.9036E − 04 | C41: 1.6786E − 05 |
| | C42: 1.8299E − 06 | C60: 5.6970E − 07 | |
| S4 | 14.147 | 26.782 | 68.65 |
| | R: ∞ | | |
| | Nd: 1.4900 | Vd: 50.0 | |
| S5 | 14.333 | 26.855 | 68.65 |
| | R: ∞ | | |
| S6 | 14.613 | 26.964 | 68.65 |
| | R: 70.000 | | |
| | Nd: 1.5600 | Vd: 61.0 | |
| S7 | 22.441 | 24.576 | 38.70 |
| | R: ∞ | | |
| S8 | 22.848 | 25.084 | 38.70 |
| | R: ∞ | | |
| | Nd: 1.5740 | Vd: 55.0 | |
| S9 | 23.238 | 25.571 | 38.70 |
| | R: ∞ | | |
| S10 | 20.506 | 22.316 | 108.65 |
| | R: ∞ | | |
| | Nd: 1.6968 | Vd: 55.5 | |
| S11 | 22.223 | 21.640 | 110.90 |
| | R: −62.53018 | | |
| | RX: −11.50000 | | |
| S12 | 25.400 | 20.427 | 110.90 |
| | R: ∞ | | |
| | Nd: 1.4900 | Vd: 50.0 | |
| S13 | 25.587 | 20.356 | 110.90 |
| | R: ∞ | | |
| SI | 26.054 | 20.177 | 110.90 | y-directional pupil diameter Dy: 6.00
y-directional LCD screen size Ly: 6.18
y-directional view angle Wy: 21.2°
angle θ between surface S6 and surface S9: 29.95°
(Dy/Ly) · W° = 20.58°
∴ (Dy/Ly) · Wy° < θ < 40°

In the present embodiment, since the surface S6 is a curved surface, θ represents the angle made by the image display surface S9 and a tangent line to the surface S6 at a point of intersection between the surface S6 and the center principal ray at the center of the field of view (a ray traveling from the center of the pupil along the direction of the Z-axis, which is approximately equal to the reference ray L0 used in the description of the basic structure of the present invention).

The optical action in the present embodiment will be described below. As illustrated in FIG. 11, only the linearly polarized light component of a specific direction, out of the light from the light emitting surface SI of the surface light source LS, is transmitted by the surfaces S13, S12 of the polarizing plate 15. The linearly polarized light component thus transmitted is refracted and condensed at different angles between in the direction of the x-axis and in the direction of the y-axis by the toric surface S11 to travel through the surface S10. Part of the light is reflected by the reflecting film of the surface S6 and the rest is totally reflected thereby to travel through the surface S7 toward the LCD 2 and reach the image display surface S9 through the surface S8, thus illuminating the reflective LCD 2.

The light modulated and reflected by the LCD 2 travels through the surface S8 and through the surfaces S7, S6 of the prism L22 and the polarizing plate 21 transmits only the light of the polarization component perpendicular to the axis of polarization of the polarizing plate 15 in accordance with the degree of modulation by the surfaces S5, S4. The transmitted light travels through the third optically acting surface S3 of the optical element L2 toward the first optically acting surface S1 and is totally reflected by this surface S1 toward the second optically acting surface S2. The light is reflected into convergent light by this surface S2 and the convergent light travels again toward the first optically acting surface S1. Then the light is transmitted this time by this surface S1 to form a virtual image of the image displayed on the display means 2 and form the pupil SS.

In the present embodiment the surface S7 of the prism L12 is a convex surface with a power and the powers are properly allocated to the respective curved surfaces forming the enlarging optical system, which can decrease the sensitivity of each surface forming the optical element L2 and increase tolerances thereof. In the present embodiment the surface S11 forming the illumination optical system is the toric surface with different curvatures between in the x-direction and in the y-direction, so as to properly correct for the difference between angles of incidence of principal rays to the liquid crystal display surface in the x-direction and in the y-direction in the display (enlarging) optical system, thereby increasing the illumination efficiency.

Figure 13:
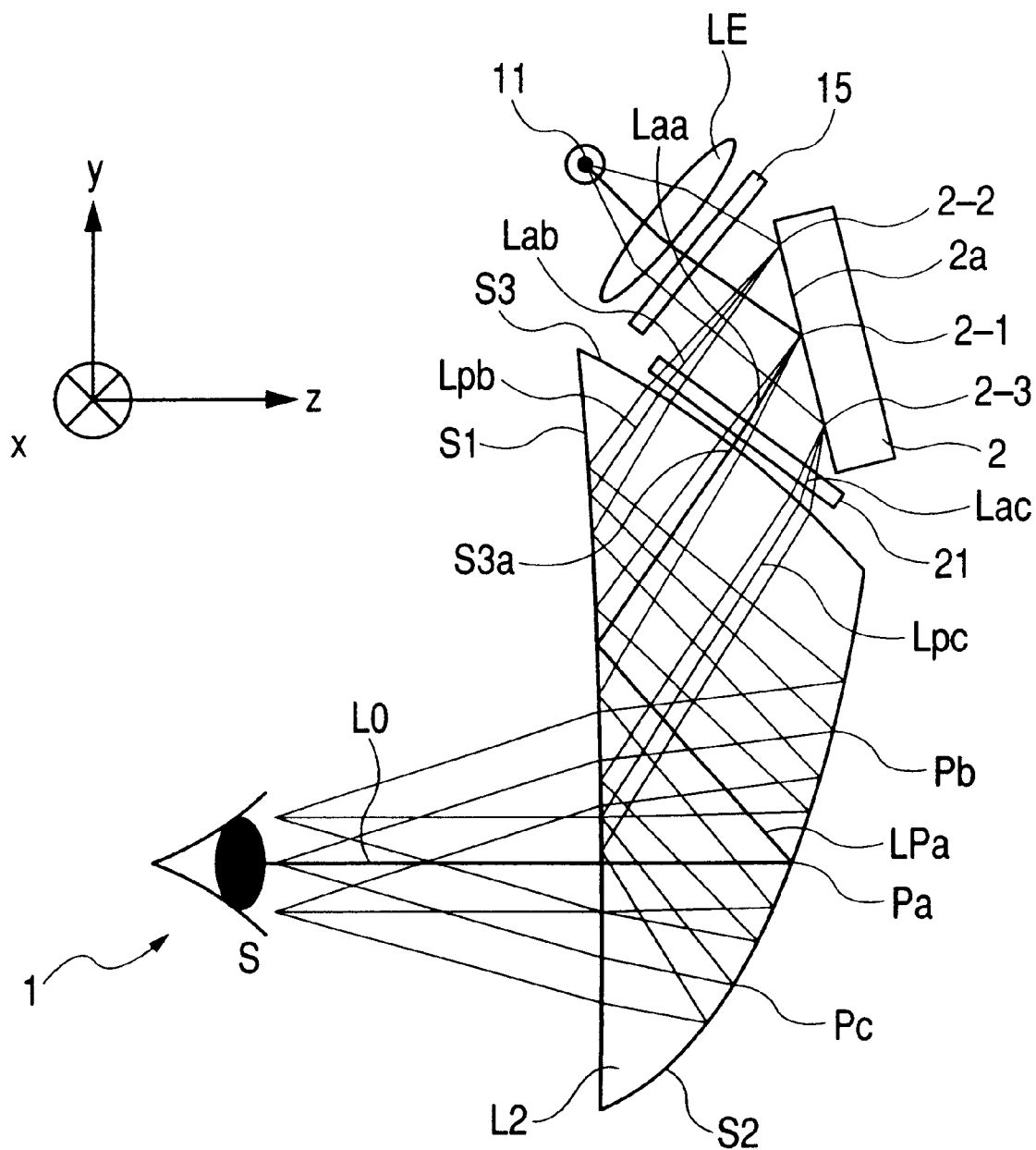
FIG. 13 is a schematic diagram of the major part to show the basic structure of an optical system of the image display apparatus according to a further aspect of the present invention.

FIG. 13 is a schematic diagram of the major part to show the basic structure of the image display apparatus according to a further aspect of the present invention. In the drawing L2 represents an optical element constituting the display optical system (enlarging optical system), which has the first, second, and third optical surface (also referred to as "surfaces") S1, S2, S3 each comprised of a plane, a curved surface, an aspherical surface, or a rotationally asymmetric surface or the like. S indicates the desired pupil position of the observer (which is the position of the exit pupil formed by the optical element L2).

Numeral 2 designates the reflective display means comprised of a reflective LCD, and 2a the display surface (liquid crystal surface) thereof. The display means 2 in the present invention is required to have a wide viewing angle property, because the apparatus is constructed to make the light from the illumination optical system incident obliquely to the LCD 2 and guide the reflected light obliquely emerging therefrom to the display optical system (enlarging optical system) L2, as described hereinafter. In order to meet this requirement, for example, the ferroelectric liquid crystal (FLC) is employed. The display means may also be constructed using the TN liquid crystal with an improved viewing angle property in combination with a phase compensator.

Numeral 11 denotes the light source, which is comprised of a light source for radiating monochromatic light or white light, for example, in the case of the LCD 2 for monochromatic display or which is comprised of a light source with LEDs for emitting the three colors of R, G, and B, formed on one chip, for example, in the case of the LCD 2 for color display so as to enable the color display by controlling the emission in synchronism with the display of the image on the reflective LCD 2. LE represents the illumination optical system, which condenses the light from the light source 11 and guides the light through the polarizing plate 15 to the display surface 2a of the LCD 2.

Numerals 15 and 21 denote the polarizing plates whose axes of polarization are approximately perpendicular to each other, for example. It is noted here that the axes of polarization of the polarizing plates 15, 21 do not always have to be perpendicular to each other, but they may be properly placed in accordance with the design conditions such as the optical rotatory power of the LCD 2, the display mode, and so on. There are also cases wherein only one polarizing plate immediately before the display surface 2a is sufficient depending upon the type of the LCD 2 or the like, and thus the two polarizing plates are not essential. The polarizing plates may be set as follows; the polarizing plate 15 is properly placed between the light source 11 and the LCD 2, while the polarizing plate 21 is properly placed between the LCD 2 and the optical element L2. For example, the polarizing plate 15 may also be placed between the light source 11 and the illumination optical system LE.

L0 indicates a ray passing the centers of the light source 11, the LCD 2, and the pupil S (hereinafter called "reference axis ray") on the YZ plane (the symmetry plane, which corresponds to the plane of the drawing in the present embodiment). The reference axis ray L0 is the center principal ray at the center of the field of view of the display optical system.

In the present embodiment the reference axis ray and an extension line thereof running from the light source means to the display means intersect only on the display means with the reference axis ray and an extension line thereof running from the display means to the display optical system.

Among the three optical surfaces S1, S2, and S3 of the optical element L2, at least the surfaces S1, S2 each acting as a reflecting surface are curved surfaces decentered with respect to the reference axis ray L0, thereby decreasing the thickness of the optical element L2. All the surfaces S1, S2, and S3 may also be inclined. For well correcting for the decentering aberration appearing because of the decentered placement of these curved surfaces, each optical surface S1, S2, or S3 is comprised of a rotationally asymmetric surface. All the surfaces are symmetric with respect to one YZ plane (the symmetry plane, which corresponds to the plane of the drawing in the present embodiment).

The third optical surface S3 in the optical element L2 has the shape of an aspherical surface symmetric with respect to the yz plane which is the symmetry plane. The optical surface S3 is inclined relative to the image display surface 2a of the LCD 2 (for example, a tangent plane at an intersecting point S3a between the reference axis ray L0 and the surface S3 is not parallel to the liquid crystal surface 2a). The first optical surface S1 has the shape of a spherical surface or an aspherical surface symmetric with respect to the symmetry plane, and is inclined at such an angle as to totally reflect the incident light having been refracted by the third optical surface S3.

The second optical surface S2 is a mirror surface (with a reflection film thereon) comprised of an aspherical surface strongly concave as a whole with respect to the symmetry plane (YZ plane). The surface S2 is inclined against the light totally reflected by an area of the first optical surface S1. The light reflected by the second optical surface S2 is incident at an angle below the critical angle to the first optical surface S1, and thus is transmitted by the surface S1 to reach the pupil S.

Now, let us consider the imaging relation of light from the pupil S to the LCD 2 in the display (enlarging) optical system (optical element L2) alone. The image display surface of the LCD 2 is likely to be in such an arrangement that the liquid crystal surface 2a is inclined relative to the surface S3 (for example, in such a state that the tangent plane at the intersecting point between the surface S3 and the ray traveling through the center of the pupil S and along the direction of the y-axis in the drawing is not parallel to the display surface 2a of the LCD 2), particularly, because of the difference of powers depending upon the azimuths in the surface S2 of strong power, and the difference of pathlengths in the prism after the surface S2 depending upon the azimuths.

Let us define Lpa, Lpb, or Lpc as an optical pathlength inside the prism L2 of a principal ray from a point 2-1 (2-2, or 2-3) on the display surface 2a from incidence into the surface S3 via total reflection on the surface S1 and reflection on the surface S2 to the surface S1. Further, let Laa, Lab, or Lac be an optical pathlength of the principal ray from emergence from the point 2-1 (2-2, or 2-3) on the display surface 2a to arrival at the surface S3. At this time there is the relation of Lpc>Lpa>Lpb among the optical pathlengths inside the prism. Curvatures at reflection points Pa, Pb, and Pc on the surface S2 are different and the radii of the curvatures on the yz plane are normally Pb>Pa>Pc. Therefore, the optical pathlengths from the surface S3 to the LCD 2 are in the relation of Lab>Laa>Lac, so that the liquid crystal surface 2a tends to be inclined relative to the surface S3.

The present invention positively makes use of this property to construct the apparatus in such structure that the light (illumination light) emitted from the light source 11 and traveling through the illumination optical system LE to illuminate the LCD 2 illuminates the display surface 2a without interfering with the optical element L2 and that the light (display light) guided from the display surface 2a through the optical element L2 enters the optical element L2 without interfering with the illumination optical system LE.

The optical action in the basic structure of the present invention will be described next. As illustrated in FIG. 13, the light from the light source 11 is condensed by the illumination optical system LE, is aligned into a direction of polarization (for example, s-polarized light) by the polarizing plate 15, and is guided without crossing the display (enlarging) optical system L2 to illuminate the reflective image display means 2 obliquely in the yz plane with respect to the normal to the display surface 2a of the image display means 2.

The light modulated (rotated by each pixel) according to the image information and reflected by the display surface 2a of the image display means 2 is subjected to selection by the polarizing plate 21 (for example, light from pixels after 90° rotation into p-polarized light by the image display means 2 is transmitted, while light from pixels in the form of s-polarized light without rotation by the image display means 2 is intercepted) to become display light having the image information. The display light is incident to the optical element L2 of the enlarging optical system without crossing the illumination optical system LE anymore. The display light travels first through the third optical surface S3 toward the first optical surface S1 and is incident at an angle over the critical angle to the surface S1. The light is totally reflected by this surface S1 toward the second optical surface S2 and is reflected into convergent light by this surface S2. The light travels again toward the first optical surface S1 and then is incident this time at an angle below the critical angle to this surface S1. The light travels through the surface S1 to form a virtual image and reach the pupil S of the observer 1, whereby the observer is allowed to view the virtual image of the image information displayed on the liquid crystal display means 2.

According to the present invention, as described above, the reference axis ray and the extension line thereof running from the light source means via the illumination optical system to the display means are arranged to intersect only on the display means with the reference axis ray and the extension line thereof running from the display means into the display optical system, whereby the compact and thin image display apparatus is accomplished while incorporating the reflective display device (display means) and the light source and illumination optical system for illuminating it.

According to the present invention, as described above, the illumination optical system LE and the display (enlarging) optical system L2 are arranged appropriately, so as to permit the light from the light source 11 to be guided to the pupil S of the observer without passing a half mirror or the like, thereby providing the bright image display apparatus with high utilization efficiency of light.

In the description of the basic structure of the present invention described above, the light source was described as one like an almost point light source, but it may also be a surface light-emitting light source; further, the illumination optical system LE was described as a single lens, but it may also be composed of a plurality of lenses.

Figure 17:
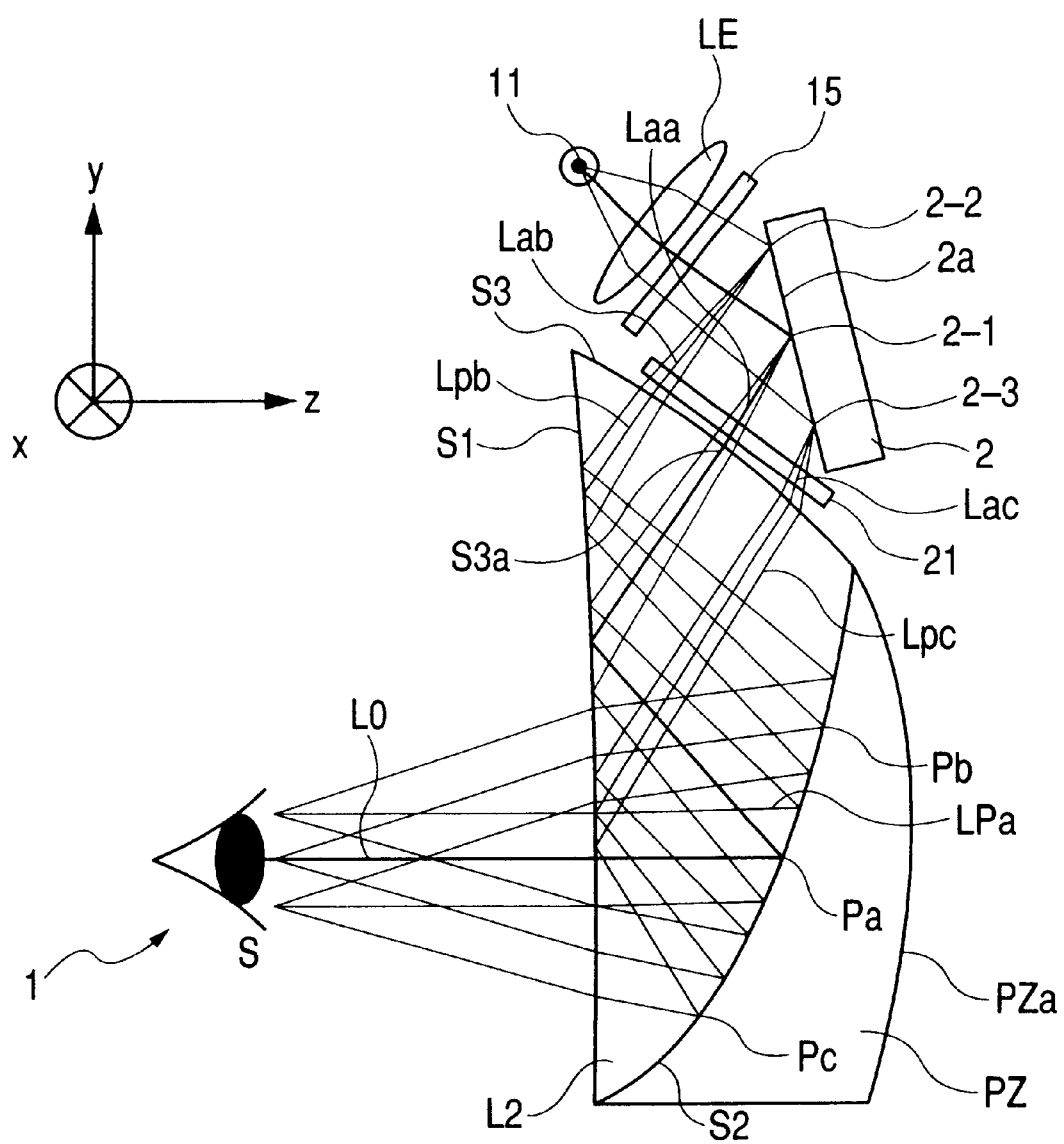
FIG. 17 is a schematic diagram of the major part of an embodiment according to a further aspect of the present invention.

In the basic structure of the present invention of FIG. 13, the apparatus may also be constructed in such structure, as illustrated in FIG. 17, that the surface S2 is comprised of a half mirror surface, a prism PZ is joined to the surface S2, and the light from the image of the external field is guided through the prism L2 and optical element PZ to the pupil S of the observer to permit the observer to observe the both of the image displayed on the display means 2 and the image of the external field. In FIG. 17 the optical system composed of the surface PZa, the surface S2, and the surface S1 constitutes an observation system for observing the image of the external field.

The structure of an embodiment based on the present invention as described above will be described below.

Figure 14:
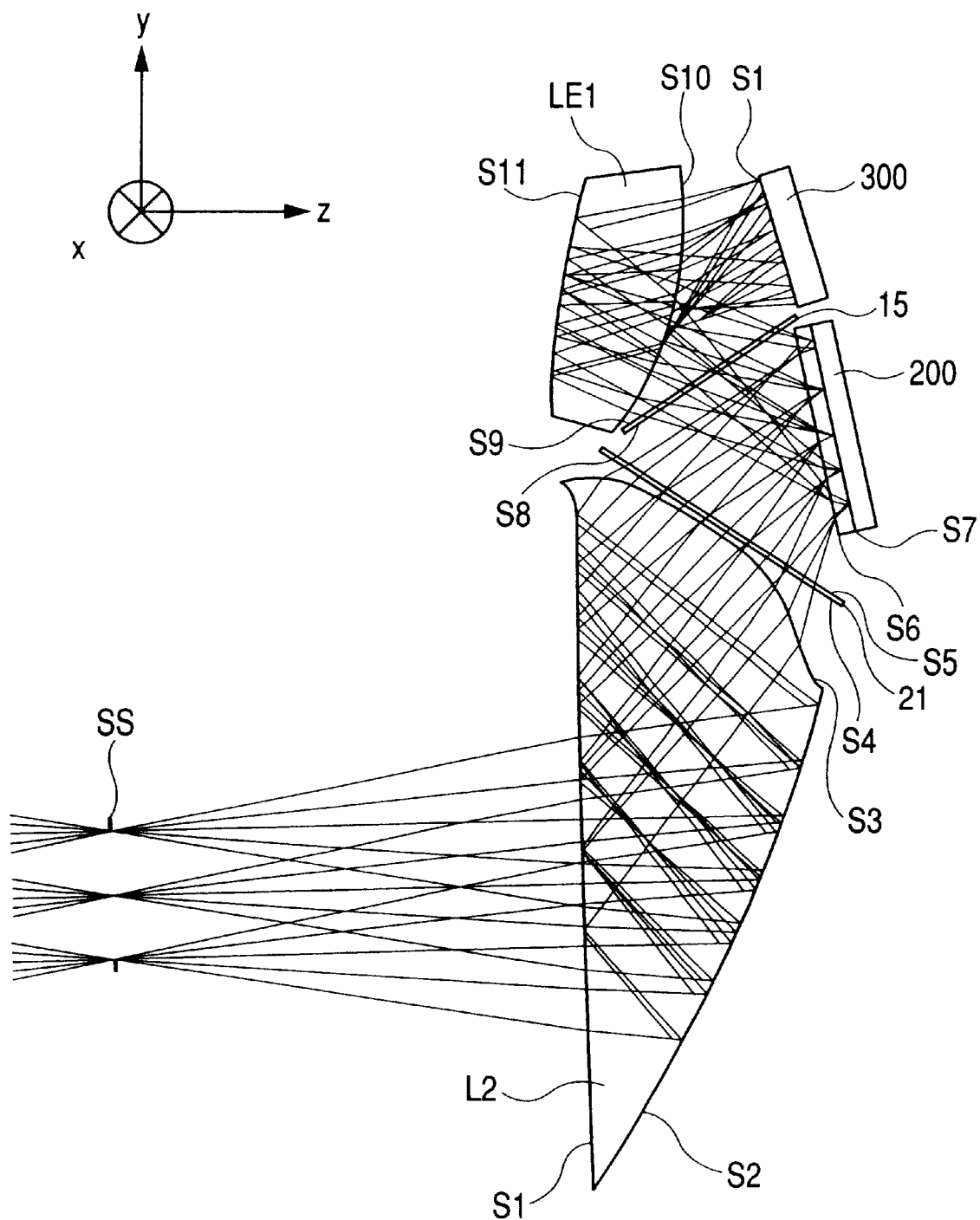
FIG. 14 is a schematic diagram of the major part of an embodiment according to a further aspect of the present invention.

FIG. 14 is a structural diagram of the major part of an embodiment of the present invention. In the drawing, SS represents the pupil of the optical element L2, and L2 an optical element which has the first, second, and third optical surfaces (hereinafter also referred to as "surfaces") S1, S2, and S3 each comprised of a rotationally asymmetric surface or the like. All the surfaces are symmetric with respect to one YZ plane (the symmetry plane, which corresponds to the plane of the drawing in the present embodiment). Numerals 15 and 21 denote polarizing plates whose axes of polarization are approximately perpendicular to each other. The polarizing plate 21 has surfaces S4, S5 and the polarizing plate 15 has surfaces S8, S9. Numeral 200 denotes a reflective LCD (display element), S7 a display surface of the reflective LCD 200, and S6 a front surface of a cover glass of the LCD 200. LE1 represents a back reflector forming the illumination optical system, S10 a transmitting surface forming the back reflector LE1, and S11 a mirror surface (with a reflection film thereon). Numeral 300 indicates a surface light source, which can be one properly selected from the combination of the light guide plate with the light emitting element placed on the side like the known back light source or the like, the surface light source formed by placing the light emitting element on the back of the diffusing plate, and the surface light-emitting light sources such as the EL lamps or the like. SI indicates the light emitting surface (or the diffusing surface) of the surface light source 300.

For implementing the color display on the display element 200 in the present embodiment, the light source 300 is comprised, for example, of LEDs for emitting the three colors of R, G, and B, light therefrom is guided from the side to the light guide plate, and emission of light is controlled in synchronism with the display of images on the reflective LCD 200. The illumination optical system LE1 condenses the light from the light source 300 and guides the light to the display surface S7 of the LCD 200.

The shape of each aspherical surface in the present embodiment is expressed using the following equation.

$$z = (1/R)*(x^2+y^2)/(1+(1-(1+c1)*(1/R)*(x^2+y^2))(\tfrac{1}{2}))+c2+c4*y+c5*(x^2-y^2)+c6*(-1+2*x^2+2*y^2)+c10*(-2*y+3*x^2*y+3*y^3)+c11*(3*x^2*y-y^3)+c12*(x^4-6*x^2*y^2+y^4)+c13*(-3*x^2+4*x^4+3*y^2-4*y^4)+c14*(1-6*x^2+6*x^4-6*y^2+12*x^2*y^2+6*y^4)+c20*(3*y-12*x^2*y+10*x^4*y-12*y^3+20*x^2*y^3+10*y^5)+c21*(-12*x^2*y+15*x^4*y+4*y^3+10*x^2*y^3-5*y^5)+c22*(5*x^4*y-10*x^2*y^3+y^5)+c23*(x^6-15*x^4y^2+15*x^2*y^4-y^6)+c24*(-5*x^4+6*x^6+30*x^2*y^2-30*x^4*y^2-5*y^4-30*x^2*y^4+6*y^6)+c25*(6*x^2-20*x^4+15*x^6-6*y^2+15*x^4*y^2+20*y^4-15*x^2*y^4-15*y^6)+c26*(-1+12*x^2-30*x^4+20*x^6+12*y^2-60*x^4*y^2-30*y^4-60*x^2*y^2+60*x^2y^4+20*y^6)).$$

The data of the optical system of the present embodiment will be listed below. The data will be expressed by defining a reference coordinate system as a coordinate system having the origin (x, y, z)=(0, 0, 0) at the center of the pupil SS of the optical element and indicating (y, z, a) of a y-coordinate, a z-coordinate, and an angle of rotation about the x-axis (whose positive direction is the counterclockwise direction on the plane of the drawing and whose unit is degrees) of a relative position of a coordinate system for defining each surface with respect to the reference coordinate system.

In the table R indicates the radius of curvature of a surface of interest, and Nd (vd) a refractive index (Abbe's number) after the surface of interest. If light travels plural times through a single plane the data given will represent those on the medium side which is not air. If a surface is used as a reflecting surface no data will be given as to the above factors.

Data with Rx represents a toroidal surface, data with the aspherical coefficients C1, C2, . . . an aspherical surface according to the aspherical equation defined in the present embodiment, and a surface without indication of these a spherical surface. In a surface with indication of the aspherical coefficients, the coefficients not indicated are all 0.

In the present embodiment the horizontal field of view (the field of view in the x-direction in the drawing) is 28°, and the vertical field of view (the field of view in the y-direction in the drawing) is 21.2°.

| | |
|---|---|
| SS | (y,z,a) = (0.0, 0.0, 0.0) |
| | R: ∞ |
| S1 | (y,z,a) = (−19.826, 21.115, −3.14) |
| | R: −285.92941 Nd(vd): 1.4917(57.4) |
| | C1: 5.2945E + 01   C5: 8.9304E − 05   C6: −7.1955E − 04 |
| | C10: 3.8933E − 06   C11: −9.8007E − 05   C12: −1.1578E − 06 |
| | C13: −1.0932E − 08   C14: −8.1148E − 08   C20: −3.3501E − 09 |

-continued

|     | |     |     |     |
| --- | --- | --- | --- | --- |
|     | C21: −9.2005E − 09 | C22: −9.8652E − 09 | C23: 6.0445E − 11 | |
|     | C24: −7.7318E − 12 | C25: −2.0026E − 11 | C26: 2.4540E − 11 | |
| S2  | (y,z,a) = (−7.923, 25.496, −29.94) | | | |
|     | R: −68.46944 | | | |
|     | C1: 4.3281E − 01 | C5: −3.1347E − 03 | C6: −5.2330E − 04 | |
|     | C10: 9.3495E − 06 | C11: −6.5425E − 06 | C12: −2.0747E − 06 | |
|     | C13: −4.5992E − 07 | C14: −2.6694E − 07 | C20: 9.9749E − 09 | |
|     | C21: −6.5862E − 09 | C22: 3.8402E − 08 | C23: 3.6332E − 10 | |
|     | C24: −9.4254E − 11 | C25: 4.1760E − 10 | C26: −1.5723E − 10 | |
| S3  | (y,z,a) = (16.341, 28.487, 54.16) | | | |
|     | R: ∞ | | | |
|     | C5: 8.9202E − 03 | C6: −7.4968E − 03 | C10: 1.8641E − 03 | |
|     | C11: −1.8244E − 03 | C12: −9.2528E − 05 | C13: 6.9522E − 05 | |
|     | C14: −2.8697E − 05 | C20: −6.9024E − 06 | C21: 6.4023E − 06 | |
|     | C22: −7.0700E − 06 | C23: −1.1875E − 07 | C24: 1.2553E − 07 | |
|     | C25: −5.6164E − 08 | C26: 3.8630E − 08 | | |
| S4  | (y,z,a) = (16.600, 28.800, 55.00) | | | |
|     | R: ∞ | | | |
|     | Nd(vd): 1.4900(50.0) | | | |
| S5  | (y,z,a) = (16.764, 28.915, 55.00) | | | |
|     | R: ∞ | | | |
| S6  | (y,z,a) = (22.479, 32.919, 9.74) | | | |
|     | R: ∞ | | | |
| S7  | (y,z,a) = (22.614, 33.708, 9.74) | | | |
|     | R: ∞ | | | |
| S8  | (y,z,a) = (24.200, 28.200, −58.00) | | | |
|     | R: ∞ | | | |
|     | Nd(vd): 1.4900(50.0) | | | |
| S9  | (y,z,a) = (24.030, 28.306, −58.00) | | | |
|     | R: ∞ | | | |
| S10 | (y,z,a) = (31.659, 27.286, −0.26) | | | |
|     | R: −16.0 | | | |
|     | RX: −80.0 | | | |
|     | Nd(vd): 1.5163(64.1) | | | |
| S11 | (y,z,a) = 21.212, 7.74) | | | |
|     | R: 40.0 | | | |
| SI  | (y,z,a) = (30.678, 31.557, 15.74) | | | |
|     | R: ∞ | | | |

The optical action in the present embodiment will be described next. As illustrated in FIG. 14, the light from the light emitting surface SI of the surface light source 300 is condensed via the transmitting surface S10, the mirror surface S11, and the transmitting surface S10 of the back reflector LE1, is transmitted by the surfaces S9, S8 of the polarizing plate 15 to be converted into linearly polarized light, and is guided through the surface S6 to the image display surface S7, thus illuminating the reflective LCD 200.

The light modulated and reflected by the image display surface S7 of the LCD 200 travels through the surface S6, and the surfaces S5, S4 of the polarizing plate 21 transmit light of the polarization component normal to the axis of polarization of the polarizing plate 15. The transmitted light travels first through the third optical surface S3 toward the first optical surface S1 and is totally reflected by this surface S1 toward the second optical surface S2. The light is reflected into convergent light by this surface S2 and the convergent light travels again toward the first optical surface S1. Then the light travels this time through this surface S1 to form a virtual image and reach the pupil SS of the observer, whereby the observer is allowed to view the virtual image of the image displayed on the liquid crystal display means 200.

Figure 15:
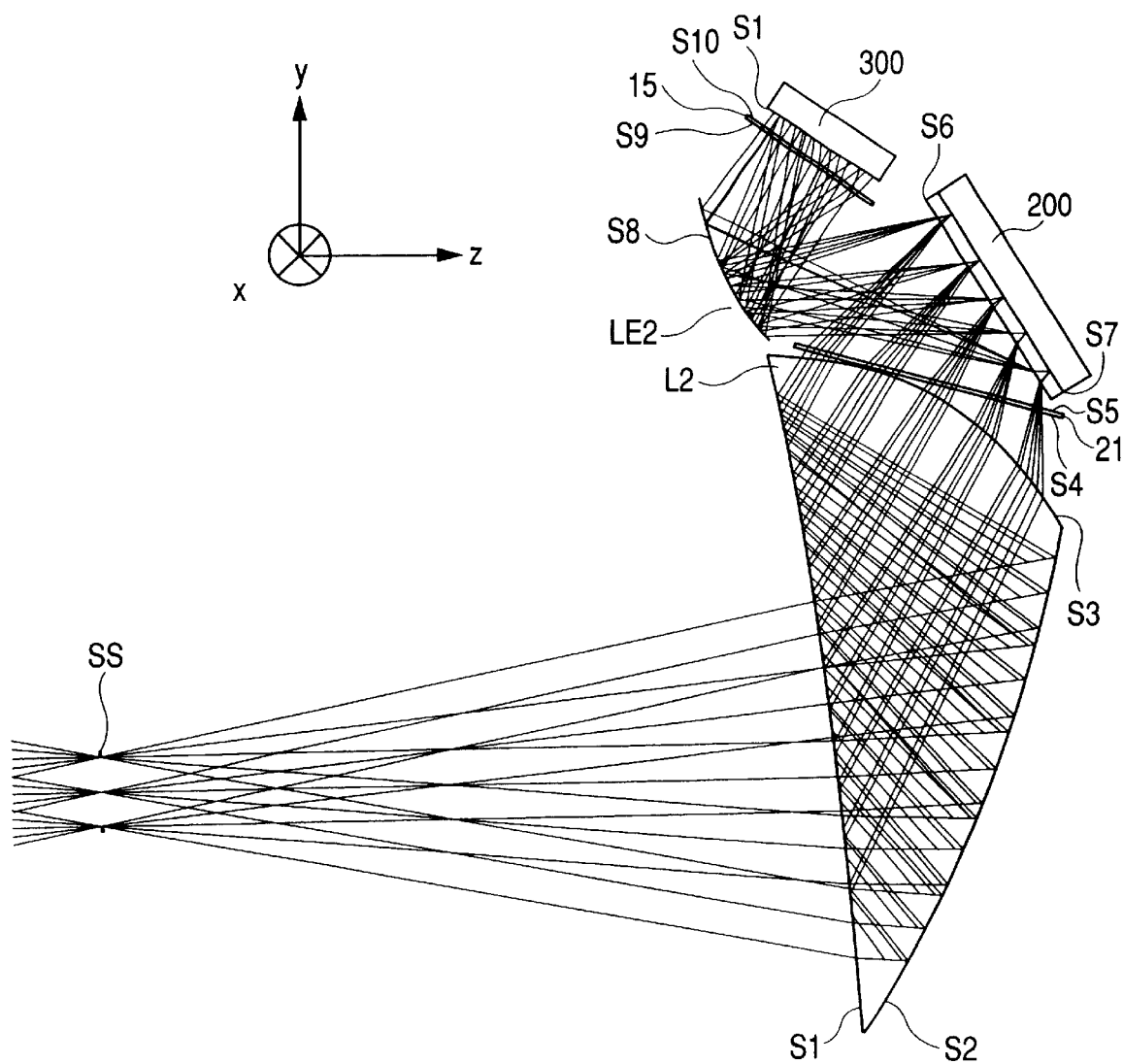
FIG. 15 is a schematic diagram of the major part of an embodiment according to a further aspect of the present invention.

FIG. 15 is a structural diagram of the major part of a further embodiment of the present invention. In the drawing, SS represents the pupil (the observer's eye) of the optical element L2, and L2 an optical element, which has the first, second, and third surfaces S1, S2, and S3 each comprised of a rotationally asymmetric surface or the like. All the surfaces are symmetric with respect to one YZ plane. Numerals 15 and 21 denote the polarizing plates whose axes of polarization are approximately perpendicular to each other. The polarizing plate 21 has surfaces S4, S5 and the polarizing plate 15 has surfaces S9, S10. Numeral 200 designates a reflective LCD, S7 a display surface of the reflective LCD 200, and S6 a front surface of a cover glass of the LCD 200. LE2 indicates the illumination optical system and S8 a mirror surface (with a reflection film thereon) forming the mirror LE2 as an illumination optical system. Numeral 300 denotes a surface light source and SI a light emitting surface of the surface light source 300.

Each of the optical surfaces S1 to S3 in the optical element L2 has the shape of an aspherical surface symmetric with respect to the symmetry plane.

The shape of each aspherical surface in the present embodiment is expressed using the following equation.

$$z: = 1/2*(1/a+1/b)*(y^2*(\cos(w))^2+x^2)/\cos(w)/(1+1/2*(1/a-1/b)*y*(\sin(w)+(1+(1/a-1/b)*y*\sin(w)-(1/a/b+1/4*(\tan(w))^2*(1/a+1/b)^2)*x^2)(\tfrac{1}{2}))+c20*x^2+c11*x*y+c02*y^2+c30*x^3+c21*x^2*y+c12*x*y^2+c03*y^3+c40*x^4+c31*x^3*y+c22*x^2*y^2+c13*x*y^3+c04*y^4+ \ldots$$

The data of the optical system of the present embodiment will be listed below. The notation for description of the data follows that in the embodiments described above.

In the present embodiment the horizontal field of view (the field of view in the x-direction in the drawing) is 30° and the vertical field of view (the field of view in the y-direction in the drawing) is 22.7°.

|     | |     |     |     |
| --- | --- | --- | --- | --- |
| SS  | (y,z,a) = (0.0, 0.0, 0.0) | | | |
|     | R: ∞ | | | |
| S1  | (y,z,a) = (−0.499, 41.297, 4.95) | | | |
|     | R: ∞ | | | |
|     | Nd(vd): 1.5709(33.8) | | | |
|     | a: −2.0582E − 03 | b: −2.0004E − 03 | w: −1.3726E + 03 | |
|     | C02: −2.9898E − 04 | C03: 1.3685E − 05 | C04: −4.4731E − 07 | |
|     | C05: −1.2631E − 08 | C06: −2.3764E − 09 | C20: −8.8463E − 04 | |
|     | C21: −7.4353E − 06 | C22: −5.4368E − 07 | C23: 3.7423E − 08 | |
|     | C24: −3.7661E − 09 | C40: 3.2990E − 06 | C41: 3.0930E − 07 | |
|     | C42: 6.9381E − 09 | C60: 4.6264E − 09 | | |
| S2  | (y,z,a) = (−2.395, 49.208, −24.04) | | | |
|     | R: ∞ | | | |
|     | a: −3.3217E − 02 | b: 1.9712E − 03 | w: −2.3946E + 01 | |
|     | C02: 9.9329E − 04 | C03: −6.3496E − 05 | C04: −4.3135E − 07 | |
|     | C05: −7.8153E − 08 | C06: 2.3405E − 09 | C2: −4.5725E − 06 | |
|     | C21: −4.3732E − 05 | C22: 9.7880E − 08 | C23: −9.7076E − 08 | |
|     | C24: −4.7754E − 10 | C40: 5.0329E − 07 | C41: 4.0517E − 08 | |
|     | C42: 8.6877E − 10 | C60: 3.1670E − 09 | | |
| S3  | (y,z,a) = (19.232, 50.737, 43.86) | | | |
|     | R: ∞ | | | |
|     | a: −2.4076E − 04 | b: −6.0279E − 05 | w: −4.4913E + 02 | |
|     | C02: −2.9546E − 02 | C03: −7.2317E − 04 | C04: 1.7167E − 05 | |
|     | C05: 1.7930E − 07 | C06: 2.8993E − 08 | C20: −2.1413E − 03 | |
|     | C21: 2.6788E − 04 | C22: 3.5128E − 05 | C23: 7.0236E − 08 | |
|     | C24: 1.5737E − 07 | C40: −9.3749E − 06 | C41: 4.0887E − 07 | |
|     | C42: −1.4887E − 07 | C60: 1.3647E − 07 | | |
| S4  | (y,z,a) = (23.000, 46.000, 74.00) | | | |
|     | R: ∞ | | | |
|     | Nd(vd): 1.4900(50.0) | | | |
| S5  | (y,z,a) = (23.192, 46.055, 74.00) | | | |
|     | R: ∞ | | | |
| S6  | (y,z,a) = (22.017, 53.636, 29.94) | | | |
|     | R: ∞ Nd(vd)   1.5230(58.6) | | | |
| S7  | (y,z,a) = (22.416, 54.329, 29.94) | | | |
|     | R: ∞ | | | |
| S8  | (y,z,a) = (26.426, 37.248, 33.94) | | | |
|     | R: 18.0 | | | |
| S9  | (y,z,a) = (35.541, 40.694, 53.94) | | | |
|     | R: ∞ | | | |
|     | Nd(vd): 1.4900(50.0) | | | |

-continued

| | |
|---|---|
| S10 | (y,z,a) = (35.703, 40.811, 53.94) |
| | R: ∞ |
| SI | (y,z,a) = (36.511, 41.400, 53.94) |
| | R: ∞ |

The optical element in the present embodiment will be described next. As illustrated in FIG. 15, the light from the light emitting surface SI of the surface light source 300 travels toward the polarizing plate 15 and only the linearly polarized light component of a predetermined direction is transmitted by the surfaces S10, S9 of the polarizing plate 15. The transmitted light travels via the mirror surface S8 of the mirror LE2 and the surface S6 to the image display surface S7, thus illuminating the reflective LCD 200.

The light modulated and reflected by the image display surface S7 of the LCD 200 travels through the surface S6, and the surfaces S5, S4 of the polarizing plate 21 transmit light of the polarization component normal to the axis of polarization of the polarizing plate 15. The transmitted light travels first through the third optical surface S3 toward the first optical surface S1 and is totally reflected by this surface S1 toward the second optical surface S2. The light is reflected into convergent light by this surface S2 and the convergent light travels again toward the first optical surface S1. Then the travels this time through this surface S1 to form a virtual image and reach the pupil SS of the observer, whereby the observer is allowed to view the virtual image of the image displayed on the liquid crystal display means 200.

Figure 16:
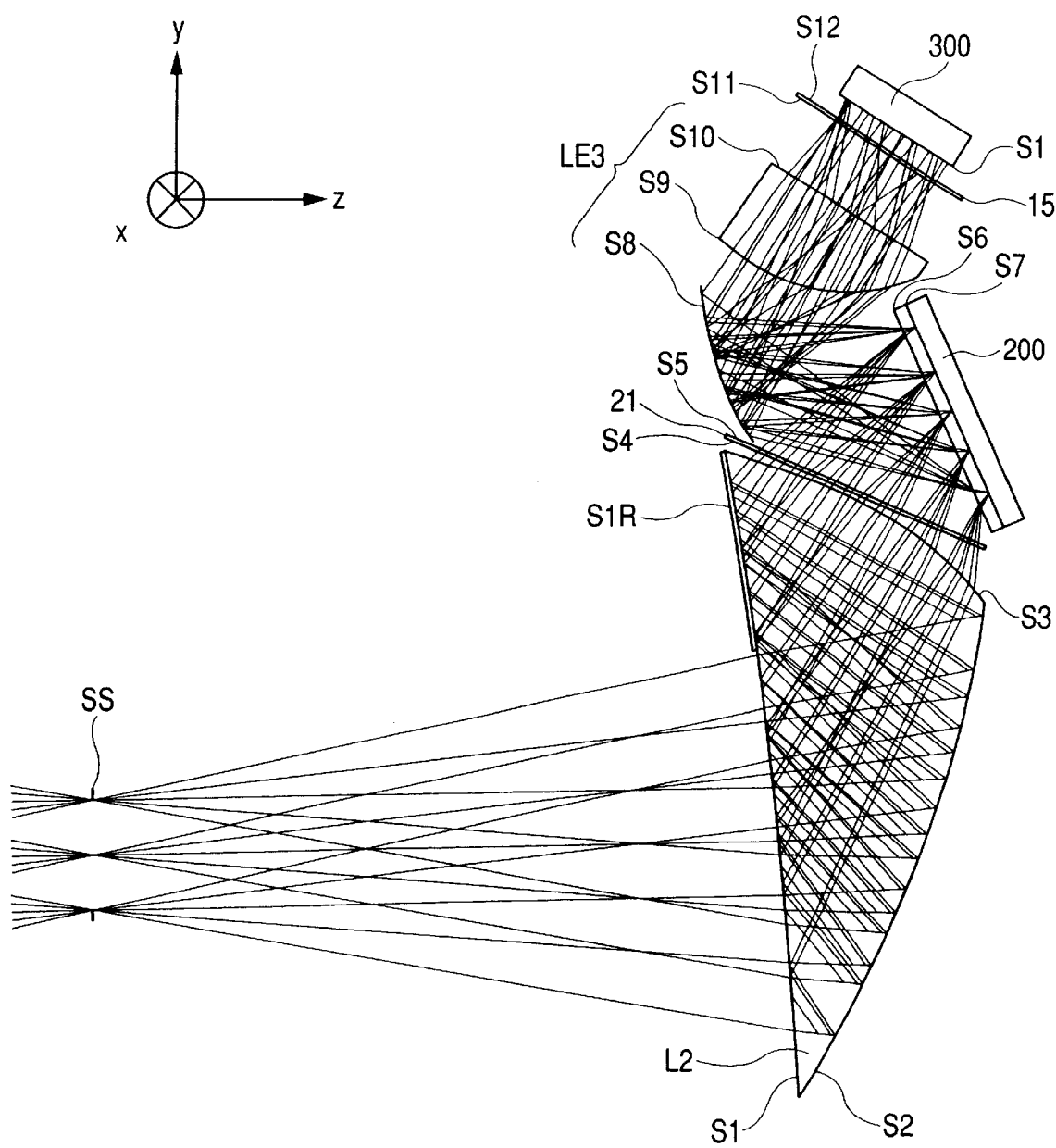
FIG. 16 is a schematic diagram of the major part of an embodiment according to a further aspect of the present invention.

FIG. 16 is a structural diagram of the major part of a further embodiment of the present invention. In the drawing, SS represents the pupil (the observer's eye) of the optical element L2, and L2 an optical element, which has the first, second, and third surfaces S1, S2, and S3 each comprised of a rotationally asymmetric surface or the like. All the surfaces are symmetric with respect to one YZ plane. Numerals 15 and 21 denote the polarizing plates whose axes of polarization are approximately perpendicular to each other. The polarizing plate 21 has surfaces S4, S5 and the polarizing plate 15 has surfaces S1, S12. Numeral 200 designates a reflective LCD, S7 a display surface of the reflective LCD 200, and S6 a front surface of a cover glass of the LCD 200. LE3 indicates the illumination optical system composed of a mirror and a lens, S8 a mirror surface (with a reflection film thereon) forming the illumination optical system LE3, and S9 and S10 transmitting surfaces forming the optical element. Numeral 300 denotes a surface light source and SI a diffusing surface forming the light emitting surface of the surface light source 300.

Each of the optically acting surfaces S1 to S3 in the optical element L2 has the shape of an aspherical surface symmetric with respect to the symmetry plane.

The shape of each aspherical surface in the present embodiment is expressed using the same equation as in the embodiment described previously (the embodiment illustrated in FIG. 15).

The data of the optical system of the present embodiment will be listed below. The notation for description of the data follows that in the embodiment described above (the embodiment illustrated in FIG. 14).

In the present embodiment the horizontal field of view (the field of view in the x-direction in the drawing) is 30° and the vertical field of view (the field of view in the y-direction in the drawing) is 22.7°.

| | |
|---|---|
| SS | (y,z,a) = (0,0, 0.0, 0.0) |
| S1 | (y,z,a) = (−1.416, 37.162, 3.47) |
| | R: ∞ |
| | Nd(vd): 1.5709(33.8) |
| | a: −2.2335E − 03   b: −2.0974E − 03   w: 3.0991E + 02 |
| | C02: −3.6366E − 04   C03: −3.0451E − 06   C04: −4.4226E − 07 |
| | C05: −1.7359E − 08   C06: −1.0864E − 09   C20: −6.8066E − 04 |
| | C21: −5.4521E − 07   C22: −7.7267E − 07   C23: −3.2796E − 08 |
| | C24: −3.2432E − 09   C40: 1.7449E − 06   C41: 2.5571E − 07 |
| | C42: 5.4885E − 09   C60: 7.7525E − 09 |
| S2 | (y,z,a) = (−2.384, 44.382, −23.77) |
| | R: ∞ |
| | a: −3.4553E − 02   b: 1.0691E − 03   w: −2.1645E + 01 |
| | C02: 3.7037E − 04   C03: −3.6898E − 05   C04: −1.2803E − 07 |
| | C05: −8.4002E − 08   C06: 2.2754E − 10   C20: 2.0165E − 04 |
| | C21: −3.2986E − 05   C22: −7.6708E − 07   C23: −9.5247E − 08 |
| | C24: −1.4098E − 09   C40: 1.0890E − 07   C41: −1.3853E − 09 |
| | C42: −7.2249E − 10   C60: 3.0269E − 09 |
| S3 | (y,z,a) = (16.198, 46.080, 48.73) |
| | R: ∞ |
| | a: −1.7380E − 02   b: −1.6879E − 02   w: −1.4492E + 03 |
| | C02: −1.8740E − 02   C03: −1.7013E − 04   C04: 9.4071E − 06 |
| | C05: 1.4214E − 06   C06: 1.4058E − 07   C20: 1.7989E − 03 |
| | C21: 4.6876E − 04   C22: 2.5366E − 06   C23: 8.4499E − 07 |
| | C24: 1.2698E − 07   C40: −4.2190E − 06   C41: 6.0897E − 07 |
| | C42: −1.3546E − 07   C60: 2.9629E − 07 |
| S4 | (y,z,a) = (19.20000   42.00000   66.00) |
| | R: ∞ |
| | Nd(vd): 1.4900(50.0) |
| S5 | (y,z,a) = (19.38271   42.08135   66.00) |
| | R: ∞ |
| S6 | (y,z,a) = (19.144, 48.665, 22.72) |
| | R: ∞ |
| | Nd(vd): 1.5230(58.6) |
| S7 | (y,z,a) = (19.453, 49.403, 22.72) |
| | R: ∞ |
| S8 | (y,z,a) = (28.195, 34.034, 12.72) |
| | R: 26.0 |
| S9 | (y,z,a) = (32.323, 35.972, 52.72) |
| | R: 10.0 |
| | Nd(vd): 1.5163(64.1) |
| S10 | (y,z,a) = (36.461, 39.122, 57.72) |
| | R: ∞ |
| S11 | (y,z,a) = (36.461, 39.122, 57.72) |
| | R: ∞ Nd(vd): 1.4900(50.0) |
| S12 | (y,z,a) = (38.071, 43.688, 57.72) |
| | R: ∞ |
| SI | (y,z,a) = (39.086, 44.329, 57.72) |
| | R: ∞ |

The optical action in the present embodiment will be described next. As illustrated in FIG. 16, the light from the light emitting surface SI of the surface light source 300 travels toward the polarizing plate 15 and only the linearly polarized light component of a predetermined direction is transmitted by the surfaces S11, S12 of the polarizing plate 15. The transmitted light is condensed via the transmitting surfaces S10, S9 of the illumination optical system LE3 and via the mirror surface S8 and travels through the front surface of the cover glass S6 to the image display surface S7, thus illuminating the reflective LCD 200.

The light modulated and reflected by the LCD 200 travels through the surface S6, and the surfaces S5, S4 of the polarizing plate 21 transmit only light of the polarization component normal to the axis of polarization of the polarizing plate 15. The transmitted light travels first through the third optical surface S3 toward the first optical surface S1 and is reflected by this surface S1 toward the second optical surface S2. In the present embodiment a portion not satisfying the total reflection condition in part of the surface S1 except for the portion acting as a transmitting surface described below in the surface SI is provided in the light traveling from the surface S3 via the surface S1 to the surface S2, thereby weakening the curvature of the surface so as to decrease the sensitivity and increase tolerances. For that purpose, a reflection film S1R is formed in part of the surface S1, and the reflection film is formed so as not to intercept the passing light when the surface S1 acts as a transmitting surface. This prevents loss in an amount of the light guided to the pupil SS of the observer. Then the light is reflected into convergent light by the surface S2 and the convergent light travels again toward the first optical surface S1. The light travels this time through this surface S1 to form a virtual image and reach the pupil SS of the observer, whereby the observer is allowed to view the virtual image of the image displayed on the liquid crystal display means 200.

According to the present invention, on the occasion of observing the image information displayed on the display means such as the liquid crystal display or the like, the loss in the amount of light is decreased while the scale of the whole apparatus is also decreased, by properly setting the structure of the illumination optical system from the light source means to the display means and the display optical system for guiding the light from the display means to the observer's eye, which can accomplish the image display apparatus that permits the observer to observe the image information in a wide observation field and with good image quality.

In the numerical examples shown in FIGS. 14, 15 and 16, since the mirror is used in the illumination optical system, unnecessary protrusion of the illumination optical system in the Z direction can be avoided so that the image display apparatus can be made thinner while assuring long eye relief.

According to one aspect of the present invention, the scale of the image display apparatus can be decreased and the field of view can be expanded even in the case using the reflective display device. The invention further provides the effects that the number of optically acting surfaces can be increased without increase in the scale of the apparatus, the partial charge for power and aberration correction of each surface can be set to a low level, the manufacturing is easy, and so on.

According to one aspect of the present invention, the surface acting as a reflecting surface for guiding the illumination light to the reflective display means in the illumination optical system is set at the angle less than 45° relative to the display surface of the reflective image display means, whereby the distance from the optical element forming the display optical system to the reflective display means can be decreased as compared with the system incorporating the conventional 45° mirror and whereby the compact and thin image display apparatus can be accomplished while incorporating the reflective image display means and the light source and illumination optical system for illuminating it and while assuring the sufficient field of view and eye relief; and the light from the light source is guided to the observer's pupil without passing a half mirror or the like, by placing the prism with the surface acting as a totally reflecting surface in the illumination optical system and also acting as a transmitting surface in the enlarging optical system, which can accomplish the bright image display apparatus with high utilization efficiency of light.

What is claimed is:

1. An image display apparatus comprising:
   reflective display means;
   an illumination optical system for making light from light source means obliquely incident to a display surface of the display means; and
   a display optical system for guiding light from the display means to an observer to permit the observer to observe image information displayed on the display means, without forming an intermediate image of the image information displayed on the display means,
   wherein a principal ray emerging from a central part of the display means is emergent obliquely with respect to the display surface from the display means, the display optical system comprises a rotationally asymmetric surface which is decentered with respect to the light guided to the observer from said display means and which reflects the light guided to the observer from said display means, the illumination optical system and the display optical system share at least one optical element which does not include said rotationally asymmetric surface which is decentered with respect to the light guided to the observer from said display means and which reflects the light guided to the observer from said display means, and at least one surface of the optical element(s) shared is a curved surface.

2. An image display apparatus comprising:
   reflective display means;
   an illumination optical system for guiding light from light source means to the display means; and
   a display optical system for guiding the light reflected by the display means to the eye of an observer to allow the observer to observe an image without forming an intermediate image of an image information displayed on the display means,
   wherein at least one surface of the display optical system is a rotationally asymmetric surface which is decentered with respect to the light guided to the observer from said display means and which reflects the light guided to the observer from said display means, a principal ray of display light at a center of a field of view from the display means is emergent at a predetermined angle relative to a normal to a display surface of the display means, the illumination optical system and the display optical system share at least one optical element which does not include said rotationally asymmetric surface which is decentered with respect to the light guided to the observer from said display means and which reflects the light guided to the observer from said display means, and at least one surface of the optical element(s) is a curved surface.

3. The image display apparatus according to claim 1 or 2, wherein said surface of the optical element is a rotationally asymmetric surface.

4. The image display apparatus according to claim 1 or 2, wherein said optical element comprises a surface acting as a transmitting surface in an optical path of said display optical system and acting as a reflecting surface in an optical path of said illumination optical system.

5. The image display apparatus according to claim 4, wherein said surface of said optical element acts as a surface having a positive power in both of said display optical system and said illumination optical system.

6. The image display apparatus according to claim 4, wherein said surface of said optical element is a curved surface.

7. The image display apparatus according to either one of claims 1 and 2, wherein said reflective display means is a ferroelectric liquid crystal display.

8. An image display apparatus wherein light from light source means is guided via a first prism of a single medium having three or more optical surfaces comprising at least one decentered surface, to illuminate reflective display means obliquely, and light emerging obliquely from the display means is guided, via part of the optical surfaces of the first prism and via a second prism of a single medium having three or more optical surfaces comprising at least one decentered surface, to an observer, without forming an intermediate image of an image displayed on the display means, whereby the observer is allowed to observe image information displayed on the display means.

9. The image display apparatus according to claim 8, wherein said first prism comprises an entrance surface to which the light from said light source means is incident, a half mirror surface comprised of a rotationally asymmetric surface for reflecting part of light from the entrance surface, and an exit surface from which light reflected by the half mirror surface emerges toward said display means.

10. The image display apparatus according to claim 9, wherein the light from said display means is incident through the exit surface of said first prism, the light then travels through the half mirror surface and emerges from the first prism body, and thereafter the light is incident to said second prism.

11. The image display apparatus according to claim 10, wherein said second prism comprises an entrance surface to which the light from the half mirror surface of said first prism is incident, a totally reflecting surface for totally reflecting the light from the entrance surface, a reflecting surface comprised of a rotationally asymmetric surface for reflecting the light from the totally reflecting surface, and an exit surface having the same shape as the totally reflecting surface, from which the light from the reflecting surface emerges.

12. An image display apparatus comprising:
reflective display means;
an illumination optical system for making light from light source means incident to a display surface of the display means; and
a display optical system for guiding light from the display means to the pupil of an observer to allow the observer to observe image information displayed on the display means,
wherein the illumination optical system guides the light from the light source means via a prism of a triangular prism shape making use of a totally reflecting surface to the display means, the display optical system guides the light from the display means through the totally reflecting surface of the prism to the observer, and an angle θ between the totally reflecting surface and the display surface of the display means is set so as to satisfy the following condition:

$$(Dy/Ly)\cdot Wy° < θ < 40°$$

where Dy represents a diameter of the exit pupil formed by the display optical system in the y-direction,
Ly represents an effective image display size of the display means in the y-direction, and
Wy represents a field of view in the y-direction.

13. The image display apparatus according to claim 12, which satisfies the following condition:

$$(Dy/Ly)\cdot Wy° < Pθ < 40°$$

where Pθ represents a prism vertex angle of said prism.

14. An image display apparatus comprising:
light source means;
reflective display means;
an illumination optical system for guiding light from the light source means to the display means;

a display optical system for guiding the light reflected by the display means to the pupil of an observer and making the observer recognize a virtual image formed thereby as an enlarged image of an image displayed on the display means; and
an optical member comprising surface acting to totally reflect light when guiding the light from the light source means to the display means and acting to transmit light when guiding the light reflected by the display means to the pupil,
wherein an angle θ between the surface and an image display surface of the display means is set to satisfy θ<45°.

15. The image display apparatus according to claim 14, wherein said display optical system comprises an optical element making use of a plurality of reflecting surfaces and each of said reflecting surfaces forming the optical element is comprised of a surface decentered from a principal ray at a center of a field of view.

16. The image display apparatus according to claim 15, wherein at least one optical surface forming said optical element is a rotationally asymmetric surface.

17. The image display apparatus according to claim 16, wherein one of said rotationally asymmetric surfaces comprises a surface acting as a totally reflecting surface and also as a transmitting surface.

18. The image display apparatus according to claim 14, wherein said optical member is comprised of a prism in which an entrance surface, a reflecting surface, and an exit surface are formed integrally, and the light from said light source means is guided into the entrance surface, is reflected by the reflecting surface, and is guided out of the exit surface toward said display means.

19. The image display apparatus according to claim 18, wherein at least a partial area makes use of total reflection, out of reflection on the reflecting surface of said optical member.

20. The image display apparatus according to claim 19, wherein said optical member comprises at least one curved surface.

21. The image display apparatus according to claim 20, wherein said illumination optical system comprises at least one rotationally asymmetric surface.

22. The image display apparatus according to claim 14, wherein said display means is a ferroelectric liquid crystal display.

23. The image display apparatus according to claim 14, wherein said light source means comprises a light source for emitting light of three colors of R, G, and B and the light source means emits the light in synchronism with image display on said display means.

24. The image display apparatus according to claim 23, wherein said light source comprises LEDs for emitting the light of the three colors of R, G, and B.

25. An image display apparatus comprising:
reflective display means;
an illumination optical system for making light from light source means incident to a display surface of the display means; and
a display optical system for guiding light from the display means to the pupil of an observer to allow the observer to observe image information displayed on the display means,
wherein the illumination optical system guides the light from the light source means via an optical member making use of a totally reflecting surface to the display means and the display optical system guides the light from the display means through the totally reflecting surface of the optical member to the observer.

26. The image display apparatus according to claim 25, wherein said display optical system comprises an optical element making use of a plurality of reflecting surfaces and each of said reflecting surfaces forming the optical element is comprised of a surface decentered from a principal ray at a center of a field of view.

27. The image display apparatus according to claim 26, wherein at least one surface forming said optical element is comprised of a rotationally asymmetric surface.

28. The image display apparatus according to claim 27, wherein one of said rotationally asymmetric surfaces comprises a surface acting as a totally reflecting surface and also as a transmitting surface.

29. The image display apparatus according to claim 25, wherein said optical member is comprised of a prism in which an entrance surface, a reflecting surface, and an exit surface are formed integrally, and the light from said light source means is guided into the entrance surface, is reflected by the reflecting surface, and is guided out of the exit surface toward said display means.

30. The image display apparatus according to claim 29, wherein at least a partial area makes use of total reflection, out of reflection on the reflecting surface of said optical member.

31. The image display apparatus according to claim 30, wherein said optical member comprises at least one curved surface.

32. The image display apparatus according to claim 31, wherein said illumination optical system comprises at least one rotationally asymmetric surface.

33. The image display apparatus according to claim 25, wherein said display means is a ferroelectric liquid crystal panel.

34. The image display apparatus according to claim 25, wherein said light source means comprises a light source for emitting light of three colors of R, G, and B and the light source means emits the light in synchronism with image display on said display means.

35. The image display apparatus according to claim 34, wherein said light source comprises LEDs for emitting the light of the three colors of R, G, and B.

36. An image display apparatus comprising:
reflective display means;
an illumination optical system for making light from light source means incident to a display surface of the display means; and
a display optical system for guiding light from the display means to the pupil of an observer to allow the observer to observe image information displayed on the display means, wherein said illumination optical system includes an optical member having a positive power independent of said display optical system, and a divergent light beam from the light source means is converged by said optical member of said illumination optical system and guided to said display means, and
wherein the display optical system is arranged so as not to interfere with an illumination optical path running from the light source means to the display means and the illumination optical system is arranged so as not to interfere with a display optical path running from the display means to the display optical system.

37. The image display apparatus according to claim 36, wherein said display optical system comprises a plurality of reflecting surfaces and each of said plurality of reflecting surfaces is comprised of a surface decentered from a principal ray at a center of a field of view.

38. The image display apparatus according to claim 37, wherein said display optical system comprises an optical surface acting as a totally reflecting surface and also as a transmitting surface.

39. The image display apparatus according to claim 38, wherein a reflection film is formed in part of said surface functioning as a totally reflecting surface and also as a transmitting surface.

40. The image display apparatus according to either one of claims 37 to 39, wherein a surface forming said display optical system is comprised of a rotationally asymmetric surface.

41. The image display apparatus according to claim 36 or 37, wherein said reflective display means is a ferroelectric liquid crystal panel.

42. The image display apparatus according to claim 41, wherein polarizing plates whose axes of polarization are approximately perpendicular to each other are placed between said light source means and said display means and between said display means and said display optical system.

43. The image display apparatus according to claim 36, wherein a reference axis ray traveling from said light source means to said display means intersects with a reference axis ray traveling from the display means to said display optical system only on the display means.

44. An image display apparatus comprising:
reflective display means;
an illumination optical system for making light from light source means incident to the display means; and
a display optical system for guiding light from the display means to an observation position of an observer, the display optical system comprising a plurality of decentered reflecting surfaces each having an optical power, said reflecting surfaces being decentered with respect to a principal ray at a center of a field of view,
wherein the principal ray at the center of a field of view passes a center of an exit pupil of the display optical system and is emergent at a predetermined angle relative to a normal to an image display surface of the display means, and
wherein the illumination optical system and the display optical system have a common surface which acts as a reflecting surface when the light from the light source means is guided to the display means and which acts as a transparent surface when the light from the display means is guided to the observer.

45. The image display apparatus according to claim 44, wherein said display optical system comprises an optical element in which an entrance surface, a plurality of decentered, curved, reflecting surfaces, and an exit surface are made in surfaces of a material.

46. The image display apparatus according to claim 44, wherein the decentered, reflecting surfaces each with the optical power forming said display optical system are rotationally asymmetric surfaces.

47. The image display apparatus according to claim 44, wherein said illumination optical system comprises an optical element having a positive power and being independent of the display optical system.

48. The image display apparatus according to claim 44, wherein said illumination means turns on light of the three primary colors of R, G, and B in time series in synchronism with image display on said display means, thereby implementing color display.

49. The image display apparatus according to claim 44, wherein said display means is a ferroelectric liquid crystal panel.

50. The image display apparatus according to claim 44, wherein said illumination optical system comprises a first polarizing plate for forming illumination light linearly polarized in a predetermined direction and said display optical system comprises a second polarizing plate whose axis of polarization is approximately perpendicular to that of the first polarizing plate.

51. An image display apparatus comprising:

reflective display means;

an illumination optical system for making light from light source means obliquely incident to a display surface of the display means; and a display optical system for guiding light from the display means to an observer to permit the observer to observe image information displayed on the display means, wherein a principal ray emerging from a central part of the display means is emergent obliquely with respect to the display surface from the display means, the display optical system comprises a decentered, rotationally asymmetric, reflecting surface, the illumination optical system and the display optical system share at least one optical element, and at least one surface of the optical element(s) shared is a curved surface, and wherein said optical element comprises a surface acting as a transmitting surface in an optical path of said display optical system and acting as a reflecting surface in an optical path of said illumination optical system.

52. An image display apparatus comprising:

reflective display means;

an illumination optical system for guiding light from light source means to the display means; and a display optical system for guiding the light reflected by the display means to the eye of an observer to allow the observer to observe an image, wherein at least one surface of the display optical system is a decentered, rotationally asymmetric, reflecting surface, a principal ray of display light at a center of a field of view from the display means is emergent at a predetermined angle relative to a normal to a display surface of the display means, the illumination optical system and the display optical system share at least one optical element, and at least one surface of the optical element(s) is a curved surface, and wherein said optical element comprises a surface acting as a transmitting surface in an optical path of said display optical system and acting as a reflecting surface in an optical path of said illumination optical system.

53. The image display apparatus according to claim 51 or 52, wherein said surface of the optical element is a rotationally asymmetric surface.

54. The image display apparatus according to claim 51 or 52, wherein said surface of said optical element acts as a surface having a positive power in both of said display optical system and said illumination optical system.

55. The image display apparatus according to claim 51 or 52, wherein said surface of said optical element is a curved surface.

56. The image display apparatus according to either of claims 51 or 52, wherein said reflective display means is a ferroelectric liquid crystal display.

57. An image display apparatus wherein light from light source means is guided via a first prism of a single medium having three or more optical surfaces comprising at least one decentered surface, to illuminate reflective display means obliquely, and light emerging obliquely from the display means is guided, via part of the optical surfaces of the first prism and via a second prism of a single medium having three or more optical surfaces comprising at least one decentered surface, to an observer, wherein said first prism comprises an entrance surface to which the light from said light source means is incident, a half mirror surface comprised of a rotationally asymmetric surface for reflecting part of light from the entrance surface, and an exit surface from which light reflected by the half mirror surface emerges toward said display means, whereby the observer is allowed to observe image information displayed on the display means.

58. The image display apparatus according to claim 57, wherein the light from said display means is incident through the exit surface of said first prism, the light then travels through the half mirror surface and emerges from the first prism body, and thereafter the light is incident to said second prism.

59. The image display apparatus according to claim 58, wherein said second prism comprises an entrance surface to which the light from the half mirror surface of said first prism is incident, a totally reflecting surface for totally reflecting the light from the entrance surface, a reflecting surface comprised of a rotationally asymmetric surface for reflecting the light from the totally reflecting surface, and an exit surface having the same shape as the totally reflecting surface, from which the light from the reflecting surface emerges.

60. An image display apparatus comprising:

reflective display means;

an illumination optical system for making light from light source means incident to the display means; and a display optical system for guiding light from the display means to an observation position of an observer, the display optical system comprising a plurality of decentered reflecting surfaces each having an optical power, said reflecting surfaces being decentered with respect to a principal ray at a center of a field of view, wherein the illumination optical system and the display optical system share at least one optical element having a curved surface, and wherein the illumination optical system and the display optical system have a common surface which acts as a reflecting surface when the light from the light source means is guided to the display means and which acts as a transparent surface when the light from the display means is guided to the observer.

61. The image display apparatus according to claim 60, wherein said display optical system comprises an optical element in which an entrance surface, a plurality of decentered, curved, reflecting surfaces, and an exit surface are made in surfaces of a material.

62. The image display apparatus according to claim 60, wherein the decentered, reflecting surfaces each with the optical power forming said display optical system are rotationally asymmetric surfaces.

63. The image display apparatus according to claim 60, wherein said illumination optical system comprises an optical element having a positive power and being independent of the display optical system.

64. The image display apparatus according to claim 60, wherein said light source means turns on light of the three primary colors of R, G, and B in time series in synchronism with image display on said display means, thereby implementing color display.

65. The image display according to claim 60, wherein said display means is a ferroelectric liquid crystal panel.

66. The image display apparatus according to claim 60, wherein said illumination optical system comprises a first polarizing plate for forming illumination light linearly polarized in a predetermined direction and said display optical system comprises a second polarizing plate whose axis of polarization is approximately perpendicular to that of the first polarizing plate.

67. The image display apparatus according to claim 60, wherein said common surface is a curved surface.

* * * * *

UNITED STATES PATENT AND TRADEMARK OFFICE
CERTIFICATE OF CORRECTION

PATENT NO. : 6,480,337 B2
APPLICATION NO. : 09/514306
DATED : November 12, 2002
INVENTOR(S) : Kazutaka Inoguchi et al.

It is certified that error appears in the above-identified patent and that said Letters Patent is hereby corrected as shown below:

COLUMN 12:

Line 56, "45°" should read --45°.--.

COLUMN 15:

Line 47, "$(x^2-y^{2)+C6*(-1+2*x2}+2*y2)$" should read --$(x^2-y^2)+C6*(-1+2*x^2+2*y^2)$,--; and
Line 51, "$6*x^6+*x^2*y^2-30$" should read --$6*x^6+30*x^2*y^2-30$--.

COLUMN 19:

Line 15, "C04: -15.6307E - 06" should read --C04: -5.6307E - 06--;

COLUMN 24:

Line 28, "$-60*x^4*y^2$" should read --$+60*x^4*y^2$--.

COLUMN 25:

Line 31, "S11 (y, z, a) = 21.212, 7.74)" should read
--S11 (y, z, a) = (15.687, 21.212, 7.74)--.

COLUMN 27:

Line 28, "Then the travels" should read --Then the light travels--; and
Line 43, "surfaces S1," should read --surfaces S11,--.

UNITED STATES PATENT AND TRADEMARK OFFICE
CERTIFICATE OF CORRECTION

PATENT NO. : 6,480,337 B2
APPLICATION NO. : 09/514306
DATED : November 12, 2002
INVENTOR(S) : Kazutaka Inoguchi et al.

It is certified that error appears in the above-identified patent and that said Letters Patent is hereby corrected as shown below:

COLUMN 37:
Line 4, "display" should read --display apparatus--.

Signed and Sealed this

Fifteenth Day of January, 2008

JON W. DUDAS
*Director of the United States Patent and Trademark Office*